(12) United States Patent
Sturgill et al.

(10) Patent No.: US 9,944,044 B2
(45) Date of Patent: Apr. 17, 2018

(54) CONTAMINATION RESISTANT AIR PERMEABLE FABRIC LAMINATE AND GARMENTS MADE THEREFROM

(75) Inventors: Gary L. Sturgill, Lincoln University, PA (US); Michael E. Hodgins, Oxford, PA (US); Peter J. Walsh, Elkton, MD (US); William G. Hardie, Landenberg, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 255 days.

(21) Appl. No.: 12/774,999

(22) Filed: May 6, 2010

(65) Prior Publication Data
US 2011/0271416 A1 Nov. 10, 2011

(51) Int. Cl.
*B32B 38/08* (2006.01)
*B32B 5/18* (2006.01)
(Continued)

(52) U.S. Cl.
CPC ............ *B32B 5/18* (2013.01); *A41D 31/0016* (2013.01); *B32B 3/26* (2013.01); *B32B 5/022* (2013.01); *B32B 5/024* (2013.01); *B32B 5/026* (2013.01); *B32B 5/16* (2013.01); *B32B 5/22* (2013.01); *B32B 5/24* (2013.01); *B32B 5/32* (2013.01); *B32B 7/02* (2013.01); *B32B 7/12* (2013.01); *B32B 7/14* (2013.01); *B32B 27/02* (2013.01); *B32B 27/12* (2013.01); *B32B 27/30* (2013.01); *B32B 27/32* (2013.01); *B32B 27/322* (2013.01); *B32B 27/34* (2013.01); *B32B 27/40* (2013.01); *A41D 2400/22* (2013.01); *B32B 2255/10* (2013.01); *B32B 2262/0261* (2013.01); *B32B 2262/0276* (2013.01); *B32B 2262/04* (2013.01); *B32B 2262/062* (2013.01); *B32B 2262/14* (2013.01); *B32B 2266/025* (2013.01);
(Continued)

(58) Field of Classification Search
CPC .. A41D 31/0016; A41D 2400/22; B32B 5/18; B32B 5/24; B32B 5/32; B32B 7/14; B32B 27/02; B32B 27/12; B32B 27/30; B32B 27/34; B32B 2327/18; Y10S 2/904
USPC .................................................. 2/69; 428/29
See application file for complete search history.

(56) References Cited

U.S. PATENT DOCUMENTS

| 4,277,429 A | 7/1981 | Okita |
| 4,385,093 A | 5/1983 | Hubis |

(Continued)

FOREIGN PATENT DOCUMENTS

| CN | 1499995 | 5/2004 |
| EP | 970739 | 1/2000 |

(Continued)

OTHER PUBLICATIONS

International Search Report, PCT/US2011/035607, dated Jun. 5, 2011, 6 pages.

*Primary Examiner* — Jeremy R Pierce
(74) *Attorney, Agent, or Firm* — Kilpatrick Townsend & Stockton, LLP

(57) ABSTRACT

A contamination-resistant air permeable fabric laminate is disclosed that comprises a textile layer attached by discontinuous attachments to an asymmetric porous membrane comprising at least two porous regions or layers through the thickness of the membrane. Methods for making the fabric laminate are disclosed as well as garments made therefrom.

38 Claims, 11 Drawing Sheets

(51) Int. Cl.

| | | |
|---|---|---|
| A41D 31/00 | (2006.01) | |
| B32B 5/24 | (2006.01) | |
| B32B 5/32 | (2006.01) | |
| B32B 7/14 | (2006.01) | |
| B32B 27/02 | (2006.01) | |
| B32B 27/12 | (2006.01) | |
| B32B 27/30 | (2006.01) | |
| B32B 27/34 | (2006.01) | |
| B32B 5/16 | (2006.01) | |
| B32B 5/22 | (2006.01) | |
| B32B 7/02 | (2006.01) | |
| B32B 27/32 | (2006.01) | |
| B32B 5/02 | (2006.01) | |
| B32B 7/12 | (2006.01) | |
| B32B 27/40 | (2006.01) | |
| B32B 3/26 | (2006.01) | |

(52) U.S. Cl.
CPC ..... *B32B 2307/724* (2013.01); *B32B 2307/73* (2013.01); *B32B 2307/732* (2013.01); *B32B 2437/00* (2013.01); *B32B 2571/00* (2013.01)

(56) References Cited

U.S. PATENT DOCUMENTS

| | | | |
|---|---|---|---|
| 4,532,316 A | | 7/1985 | Henn |
| 4,863,604 A | | 9/1989 | Lo et al. |
| 5,050,241 A | * | 9/1991 | Flowers et al. ............ 2/457 |
| 5,064,593 A | | 11/1991 | Tamaru et al. |
| 5,154,827 A | | 10/1992 | Ashelin et al. |
| 5,183,545 A | | 2/1993 | Branca et al. |
| 5,217,666 A | | 6/1993 | Tamaru et al. |
| 5,460,872 A | | 10/1995 | Wu et al. |
| 5,476,589 A | | 12/1995 | Bacino |
| 5,539,072 A | | 7/1996 | Wu |
| 5,708,044 A | | 1/1998 | Branca |
| 5,814,405 A | | 9/1998 | Branca et al. |
| 5,910,277 A | | 8/1999 | Ishino et al. |
| 6,030,428 A | | 2/2000 | Ishino et al. |
| 6,143,675 A | | 11/2000 | McCollam et al. |
| 6,214,093 B1 | | 4/2001 | Nabata et al. |
| 6,235,377 B1 | * | 5/2001 | Dillon et al. .............. 428/212 |
| 6,541,589 B1 | | 4/2003 | Baillie |
| 7,306,729 B2 | | 12/2007 | Bacino et al. |
| 7,309,663 B2 | * | 12/2007 | Huang et al. ............... 442/86 |
| 7,374,679 B2 | | 5/2008 | Huang et al. |
| 7,531,611 B2 | | 5/2009 | Sabol et al. |
| 2004/0168417 A1 | * | 9/2004 | Tanaka ............ B01D 39/1692 55/486 |
| 2005/0260381 A1 | * | 11/2005 | Ditter et al. .............. 428/131 |
| 2007/0065658 A1 | * | 3/2007 | Bohringer et al. ......... 442/149 |
| 2007/0113315 A1 | | 5/2007 | Reynolds |
| 2008/0241504 A1 | | 10/2008 | Bansal et al. |

FOREIGN PATENT DOCUMENTS

| | | |
|---|---|---|
| EP | 1386651 | 2/2004 |
| EP | 2174779 A2 | 4/2010 |
| JP | 1982(S57)-018237 A | 1/1982 |
| JP | 11-512349 | 3/1997 |
| JP | 2000-503608 | 12/1997 |
| JP | 2000-79332 | 1/2000 |
| JP | 2000-107526 | 4/2000 |
| JP | 2004-306289 | 10/2004 |
| JP | 2005-504657 | 2/2005 |
| JP | 2007-283774 | 11/2007 |
| JP | 2010-084258 | 4/2010 |
| WO | 1998/58796 | 12/1998 |

* cited by examiner

CONTAMINATION RESISTANT AIR PERMEABLE FABRIC LAMINATE AND GARMENTS MADE THEREFROM

BACKGROUND

Outer wear garments made from laminates comprising porous polymer membranes that are air permeable are known to provide good breathability, or moisture vapor transport through the fabric. Disadvantageously, under certain conditions the water resistance of air permeable garments may be reduced upon exposure to contaminants such as surfactants, sebum and the like. To overcome the limitations of these materials, the porous polymer membrane may be coated with a continuous layer of polymer coating to protect the material from contamination. The addition of the continuous coating may help maintain water resistance upon contamination, however, disadvantageously results in air impermeable materials which may decrease wearer comfort of the garment.

SUMMARY

One embodiment described herein is an air permeable, fabric laminate for use in a garment application comprising a membrane that is resistant to penetration by synthetic sebum both before and after contamination by surfactant. The air permeable fabric laminate comprises a hydrophobic asymmetric porous membrane that comprises first and second porous membrane regions having different microstructures. The fabric laminate further comprises a textile attached by discontinuous attachments to the asymmetric porous membrane. In some embodiments, the fabric laminate has a liquid entry pressure greater than 70 kPa to a liquid having a surface tension of about 31 dynes/cm.

In another embodiment, an air permeable fabric laminate is described that comprises a hydrophobic multilayer asymmetric porous membrane comprising first and second porous membrane layers, each having a different microstructure, where there is an interface between the first and second porous layers. The air permeable fabric laminate further comprises a textile attached by discontinuous attachments to at least one side of the hydrophobic multilayer asymmetric membrane. In a further embodiment, the air permeable fabric laminate may also comprise an oleophobic treatment or coating.

In a further embodiment, a garment is described that is made from an air permeable fabric laminate comprising an asymmetric membrane that is resistant to penetration by synthetic sebum. The asymmetric membrane comprises a first region having a microstructure that is more open than the microstructure of a second region. The garment is constructed so that the membrane region having the more open microstructure is oriented closer to the source of contamination.

DESCRIPTION OF THE DRAWINGS

FIG. 5b is an SEM of an outer surface opposite the surface of the porous membrane of FIG. 5a.

FIG. 8b is a graph of gray scale value vs. distance of the SEM of the porous membrane show in FIG. 7a.

DETAILED DESCRIPTION

Figure 1:
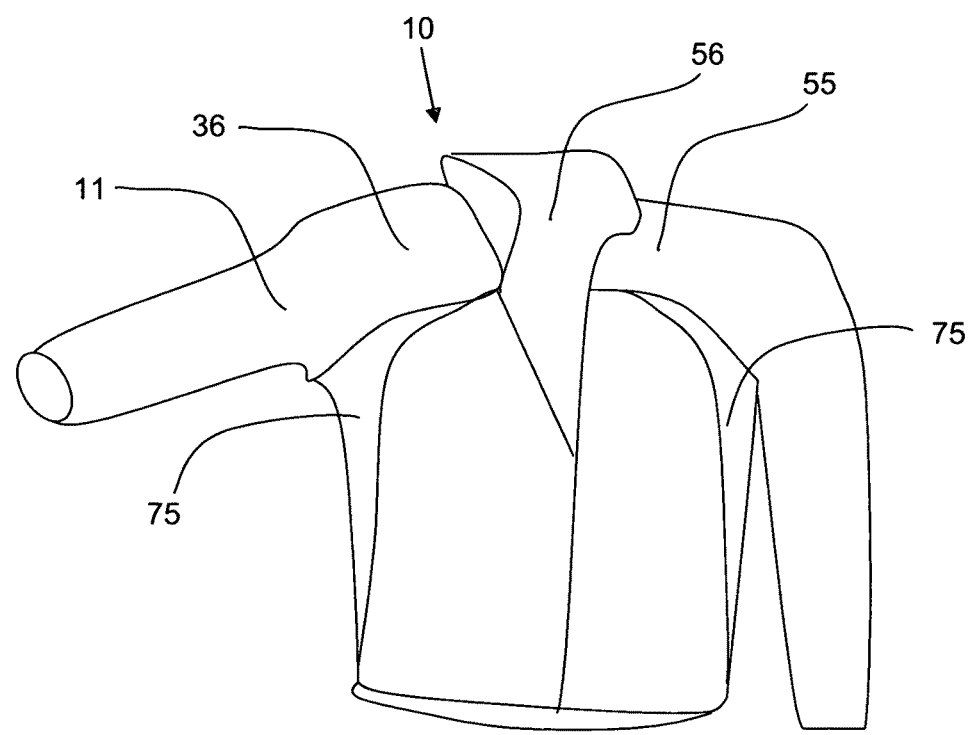
FIG. 1 is a depiction of a garment.
Figure 2:
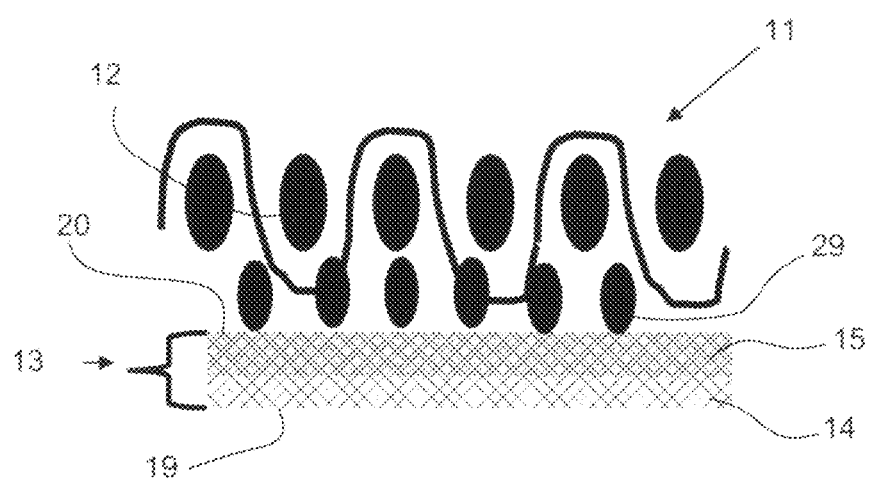
FIG. 2 is a cross-sectional schematic illustration of an exemplary embodiment of a fabric laminate.
Figure 3:
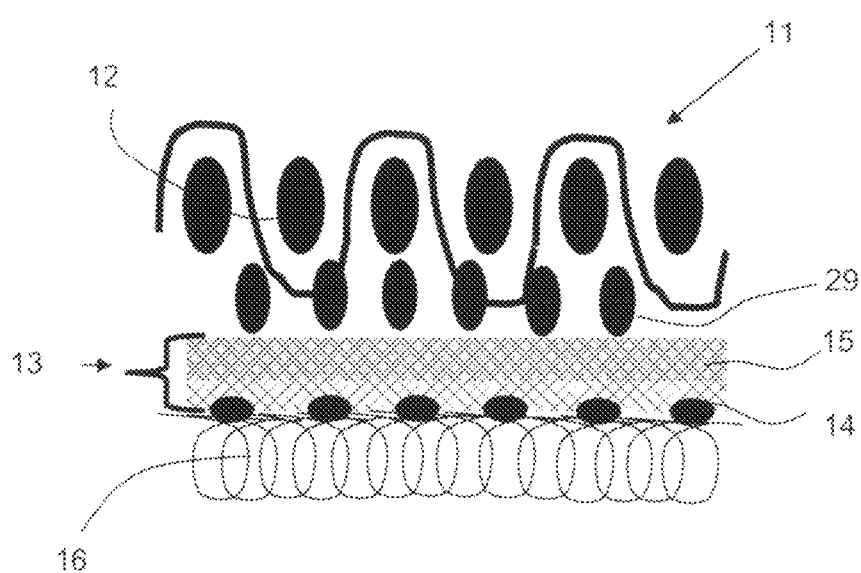
FIG. 3 is a cross-sectional schematic illustration of an exemplary embodiment of a fabric laminate.

In accordance with one embodiment, as exemplified in FIG. 1, is an outer wear garment (10) in the form of a jacket (36) that is made from a fabric laminate (11) that is both air permeable and liquidproof. In addition, the garment depicted in FIG. 1 has an exterior surface (55) and an interior surface (56). With reference to FIG. 2 and FIG. 3, the fabric laminate (11) has a textile layer (12) and an asymmetric porous membrane (13) laminated thereto by discontinuous attachments (29). The asymmetric porous membrane (13), depicted in FIG. 2 and FIG. 3 comprises a first porous membrane region (14) having a first microstructure, and a second porous membrane (15) region having second microstructure that is different from the microstructure of the first porous membrane. The fabric laminate may further comprise a second textile layer (16) laminated to the asymmetric porous membrane (13) on a side opposite the first textile layer (12) as depicted in FIG. 3. The air permeable fabric laminate is suitable for use in various applications, including but not limited to apparel, for example, garments such as a jacket, and enclosures, such as bivy bags.

In one embodiment, a fabric laminate is described that is air permeable, having a Gurley number less than about 200 seconds, and liquidproof, having a liquid entry pressure greater than 70 kPa to a 31 dynes/cm liquid, when tested according to the methods described herein. Although contamination of porous structures can typically compromise waterproofness and/or affect visual properties of the structure, surprisingly, fabric laminates described herein have improved contamination resistance while maintaining air permeability by incorporating certain porous membrane structures. By minimizing contamination of the porous membrane by low surface tension fluids, fabric laminates described herein can be made that provide durable waterproofness while maintaining air permeability.

In some embodiments described herein, fabric laminates that are air permeable and contamination resistant, incorporate porous membrane structures that are asymmetric. By "asymmetric" it is meant that the porous membrane structure comprises multiple regions through the thickness of the structure, and at least one region has a microstructure that is different from the microstructure of a second region. In one embodiment, an asymmetric porous membrane comprises multiple regions through the thickness of the structure in the form of layers, such as the layers of an expanded fluoropolymer. For example, a multilayer expanded polytetrafluoroethylene (ePTFE) membrane may comprise multiple regions through the thickness of the structure having different microstructures where at least two of the membrane layers have a different microstructure. In some embodiments where the asymmetric membrane has at least three membrane regions, two of the membrane regions may have the same microstructure, provided at least one membrane region has a different microstructure.

Figure 6:
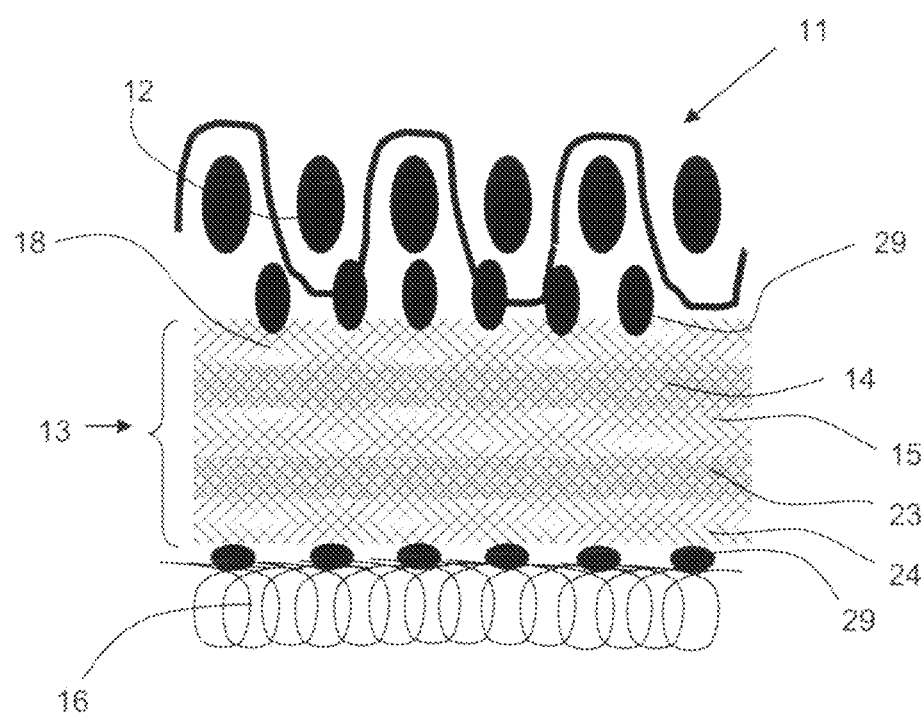
FIG. 6 is a cross-sectional schematic illustration of an exemplary embodiment of a fabric laminate.

As exemplified in the schematic illustration of FIG. 2, the porous membrane (13) comprises a first porous membrane region (14) and a second porous membrane region (15) having a microstructure that is different than the first porous membrane region. In some embodiments, the first porous membrane region (14) may have a more open structure than the second porous membrane region (15). Optionally, as exemplified in FIG. 4, the porous membrane (13) comprises a third porous membrane region (18), having a microstructure that is different than the second porous membrane region (15), and may be the same or different than the first porous membrane region (14). Porous membranes can be formed that comprise more than three regions or layers through the thickness of the membrane provided that at least two of the regions have different microstructures. For example, in a further embodiment, as illustrated in the schematic representation of FIG. 6, a porous membrane (13) comprises a fourth porous membrane region (23) and a fifth porous membrane region (24) in addition to the first (15), second (14), and third (18) porous membrane regions. The five porous membrane regions or layers (14, 15, 18, 23, and 24) are oriented through the thickness of the membrane, and at least one porous membrane region has a different microstructure from the other porous membrane regions.

Figure 5A:
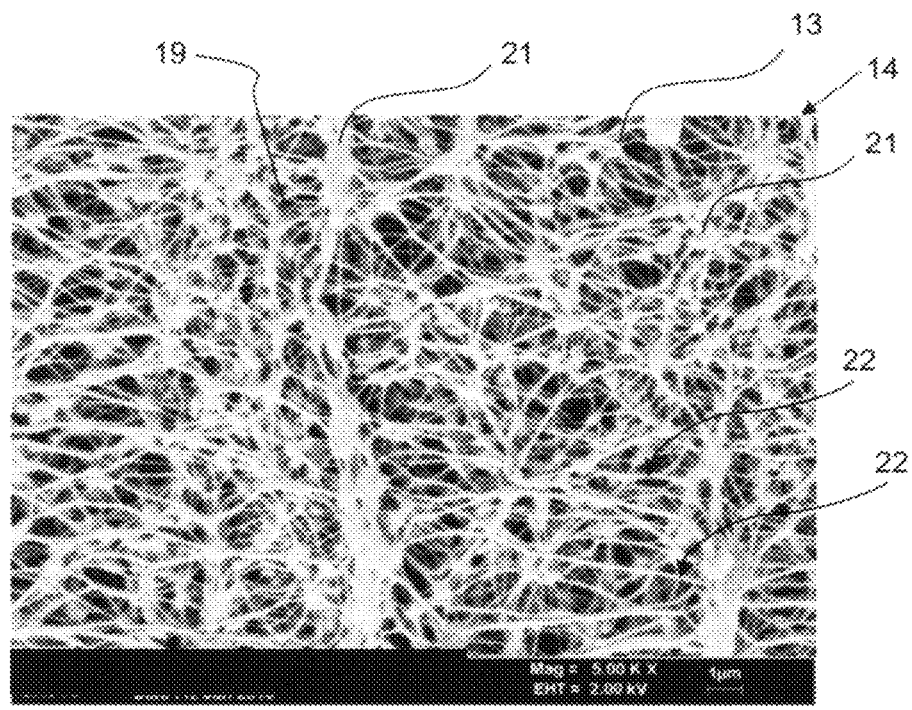
FIG. 5a is an SEM of an outer surface of an exemplary embodiment of a porous membrane.
Figure 5B:
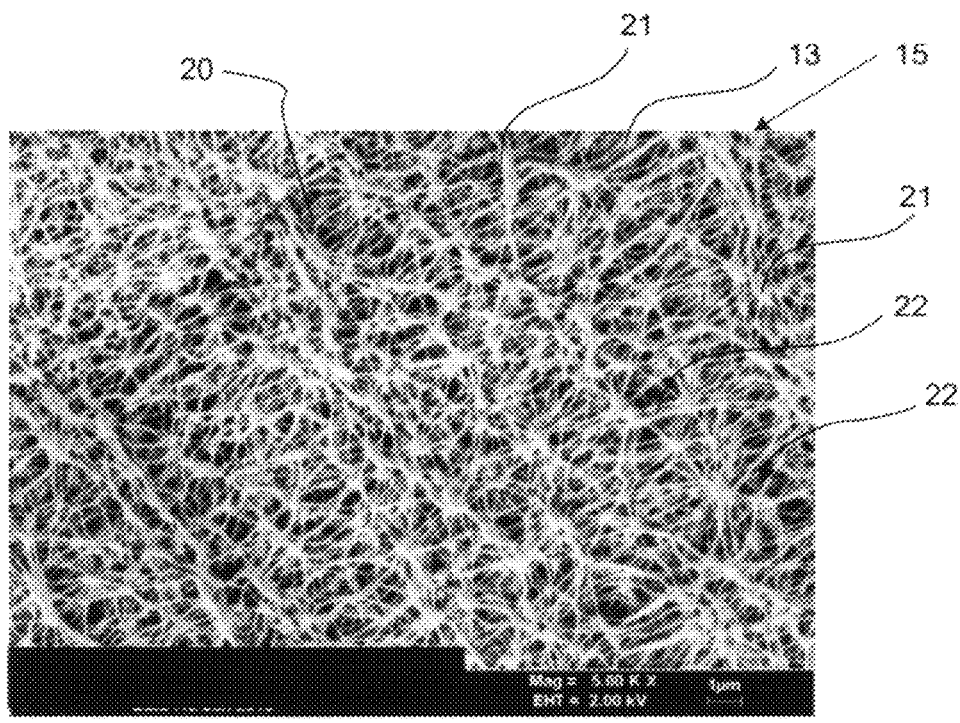

Examples of microstructures of the porous membranes include, but are not limited to the structure of open-cell foams, sintered or fused particles, or microstructures of nodes interconnected by fibrils. The difference in the microstructure of two regions may comprise, for example, a difference in pore size, or a difference in microstructure, such as a difference in node and/or fibril geometry or size, and/or nodal density. In some embodiments, the nodal density of the first porous membrane region (14) is different from the nodal density of the second porous membrane region (15). FIGS. 5a and 5b are SEM images of the outer surface (19) of a first porous membrane region (14) and the outer surface (20) of a second porous membrane region (15), respectively, of one exemplary embodiment that depict a microstructure comprising nodes (21) interconnected by fibrils (22). In some embodiments, a region of a porous membrane having a microstructure with a greater nodal density is considered as having a tighter microstructure than a region having a lower nodal density; the region of the porous membrane having a lower nodal density is conversely, considered as having a more open microstructure. In one embodiment, an air permeable fabric laminate comprises an asymmetric porous membrane wherein the nodal density of a second porous membrane region (15), is greater than the nodal density of a first porous membrane region (14) by at least 10%. In other embodiments, the nodal density of the second porous membrane region (15) is greater than the nodal density of a first porous membrane region (14) by at least 20%, or by at least 30%, or by at least 40%, when measured according to the method described herein for measuring nodal density.

Figure 7:
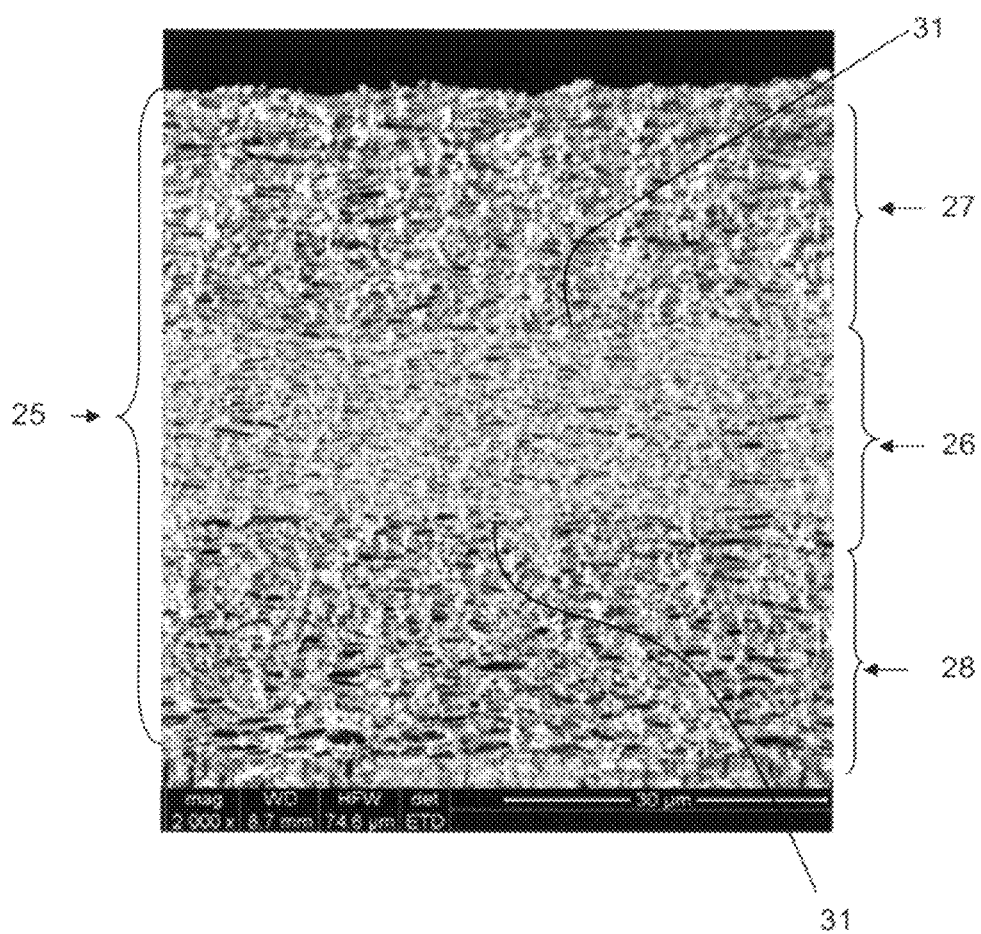
FIG. 7 is a cross-sectional view of a scanning electron micrograph (SEM) of an exemplary embodiment of a porous membrane.
Figure 8A:
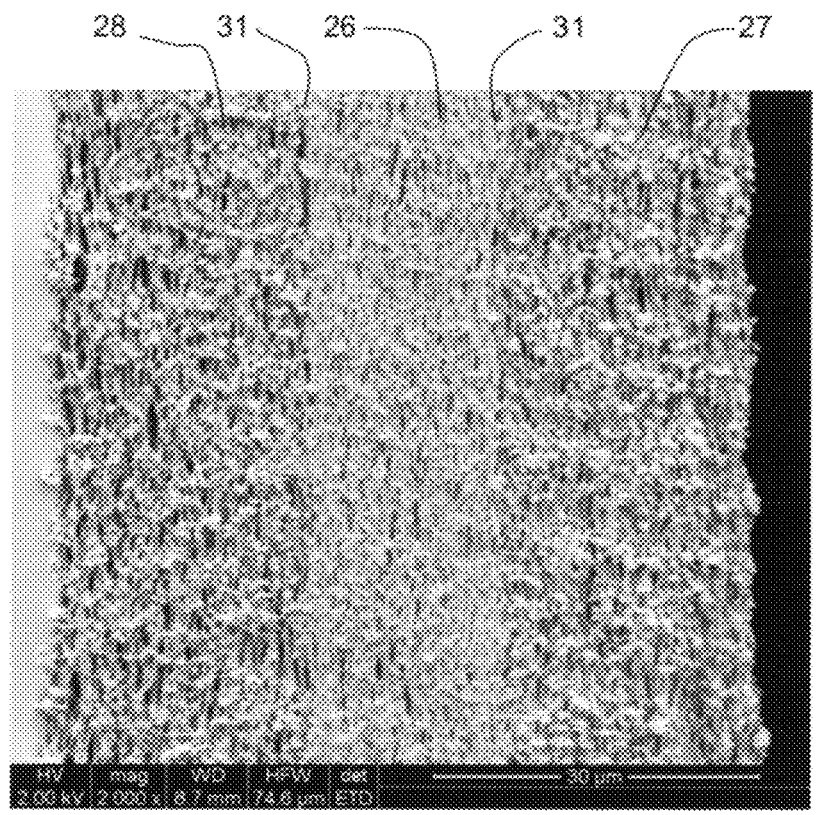
FIG. 8a is the SEM of FIG. 7 rotated 90 degrees.

A porous membrane may have two or more discrete regions through the thickness of the membrane with each region, individually, having a relatively homogeneous microstructure throughout the region, but having a different microstructure than an adjacent region. Differences between the microstructures of two regions may be detectable by a cross-sectional SEM. For example, an asymmetric porous membrane (25) comprising two outer porous membrane regions (27) and (28) comprising different microstructures than a center porous membrane region (26) is depicted in FIG. 7. In some embodiments, the adjacent regions of an asymmetric porous membrane are separated by an observable interface (FIG. 4 at 17; FIG. 7, and FIG. 8a at 31 between regions. The interface (17) between the first (14) and second (15) porous region may consist essentially of the materials of both the first and second regions.

Figure 8B:
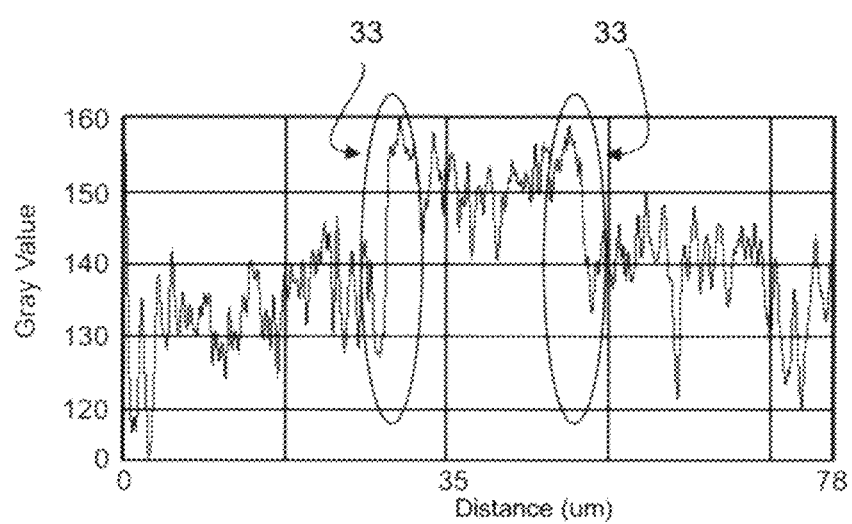

The interface (31) between the two or more discrete porous regions may be identifiable or observable, for example, by cross-sectional SEM (FIG. 8a), or by gray scale analysis of a cross-sectional SEM (FIG. 8b) of the asymmetric porous membrane using the method described herein. FIG. 8a depicts the cross-sectional SEM of FIG. 7, of a porous membrane (25) having two outer porous membrane regions (27, 28) separated by the center porous membrane region (26), which has been rotated 90-degrees. FIG. 8b is the gray values for the SEM image show in FIG. 8a, and the two figures have been aligned to show the change in gray scale value throughout the thickness of the asymmetric porous membrane as it corresponds to different regions. In some embodiments, gray scale analysis of the cross-sectional SEM may show a signal change (33) at the interfaces between two regions of a porous membrane that have different microstructures. In some embodiments the signal change at the interface may result in a change in the gray scale value that is greater than the average signal variation within the regions.

In some embodiments, a difference between the microstructure of the first porous membrane region and the microstructure of the second porous membrane region may also, or alternatively, be detected by a comparison of the "Liquid Displacement Pressure" versus the bubble point indication pressure, as described in the Liquid Displacement Pressure test method disclosed herein. In some embodiments, asymmetric membrane microstructures can be detected where the membrane has a lower liquid displacement pressure than the bubble point indication pressure. When tested by this method, wetted asymmetric porous membrane structures, such as those described herein, demonstrate an observable change in the opacity of the membrane upon displacement of the wetting liquid (liquid displacement pressure, LDP), prior to a bubble point, which is observable as a stream of bubbles. Without wishing to be bound by theory, it is believed that the region of the asymmetric porous membrane having a more open microstructure will have the liquid displaced at a pressure lower than the bubble point pressure. In comparison, membranes having a single region, and membranes having multiple layers with no difference in structure between the layers, do not have a liquid displacement pressure that is lower than the bubble point pressure.

Thus, a method is disclosed for determining the presence of an asymmetric porous membrane having an outer layer or region in the thickness direction of the membrane that has a more open microstructure than the microstructure of at least one other region or layer in the membrane. In one embodiment the method comprises applying pressurized gas to a first surface of a wetted membrane sample and simultaneously observing a second surface opposite the first surface for a change in opacity and a stream of bubbles; recording the pressure at which a change in opacity and/or the stream of bubbles is detected; reversing the sample and repeating the procedure if the stream of bubbles appears prior to a change in opacity; determining that the sample membrane has an asymmetric structure with an outer region or layer having a more open microstructure than at least one other region or layer, if the change in opacity is observed before the stream of bubbles is observed. In some embodiments, an asymmetric porous membrane has a liquid displacement pressure of at least 15 kPa. In other embodiments, the liquid displacement pressure is at least 35 kPa less than the bubble point indication pressure; in other embodiments, the liquid displacement pressure is at least 70 kPa less than the bubble point indication pressure, or at least 103 kPa less than the bubble point indication pressure, when measured according to the test described herein. In some embodiments, the fabric laminate can be tested directly, however, in other instances, it may be desirable to remove the outer textile layers to observe the membrane directly.

Polymers suitable for use in forming the porous membrane include, but are not limited to polyurethanes, polyethylene, and fluoropolymers. Where the porous membrane comprises a fluoropolymer, the membrane may have a microstructure characterized by nodes interconnected by fibrils. Porous membranes used herein have a bubble point greater than 135 kPa when tested according to the Automated Bubble Point Measurement test method described herein. In other embodiments the bubble point is greater than 170 kPa, and in still other embodiments, the bubble point is greater than 205 kPa. Suitable fluoropolymer materials include expandable fluoropolymers such as but not limited to expanded PTFE, expanded products made with polymers as described in U.S. Pat. No. 5,708,044 (Branca, 1998), U.S. Pat. No. 6,541,589 (Baillie, 2003), U.S. Pat. No. 7,531,611 (Sabol et al., 2009), U.S. patent application Ser. No. 11/906,877 (Ford), and the like.

The porous membranes may be made of a single polymer material processed to form multiple regions or multiple layers within a membrane, where at least two regions or layers have different microstructures. In one alternative, two or more regions having differing microstructures may comprise different fluoropolymer materials by processing together more than one material component to form an asymmetric porous membrane having multiple regions or layer. In one embodiment, for example, an asymmetric porous membrane comprises a first porous region comprising a homopolymer of expanded PTFE and a second porous region comprises an expanded modified PTFE.

In some embodiments, porous membranes having regions or layers with different microstructures may be made by placing more than one fluoropolymer component, such as a tape, containing lubricant in intimate contact at a step in the membrane processing operation. Fluoropolymer components containing lubricant are herein defined as "wet" components. The wet fluoropolymer components may be placed in contact in extrudate form while still containing extrusion aid, to maximize the contact of fluoropolymer components. In some embodiments, the multiple components that form discrete regions through the thickness of the asymmetric porous membrane are integrated by placing the components in direct contact with no intervening materials prior to final expansion and sintering, forming an interface between the discrete regions that are coterminous for the length and width of the membrane. In other embodiments, the fluoropolymer components or discrete layers of porous membranes may be attached using discontinuous attachments, such as an adhesive, that is applied to one or more of the components prior to or during expansion.

While the weight of the porous membrane (13) is not particularly limiting, asymmetric porous membranes having a weight between about 2 gsm (grams per square meter) and about 100 gsm may be suitable in some applications; in other embodiments, asymmetric porous membranes having a weight between about 4 gsm and about 60 gsm, or a weight between about 20 gsm and 35 gsm, are suitable in other applications.

Asymmetric porous membranes may be assembled having a variety of constructions. FIGS. 2, 3, 4, and 6 each illustrate an example of embodiments of asymmetric porous membrane structures having more than one region or layer. FIGS. 2, 3, 4, and 6, are each a schematic representation of embodiments depicting constructs wherein a first region or layer (14) has a microstructure that is more open than a second region or layer (15). As discussed herein, a difference in structure may be observable, for example, by a comparison of nodal density from scanning electron micrographs of the surface of each region of a two-region structure. Alternatively, the individual material components used to make each region of the structure can be individually processed into membranes in the manner that is the same as the process used for the aggregate multi-region structures. The bubble points of each individual membrane and the aggregate multi-region structures can be compared. A two-layer asymmetric porous membrane may have a bubble point that is the same as, or approximately the same as, the individual layer having the highest bubble point.

Figure 4:
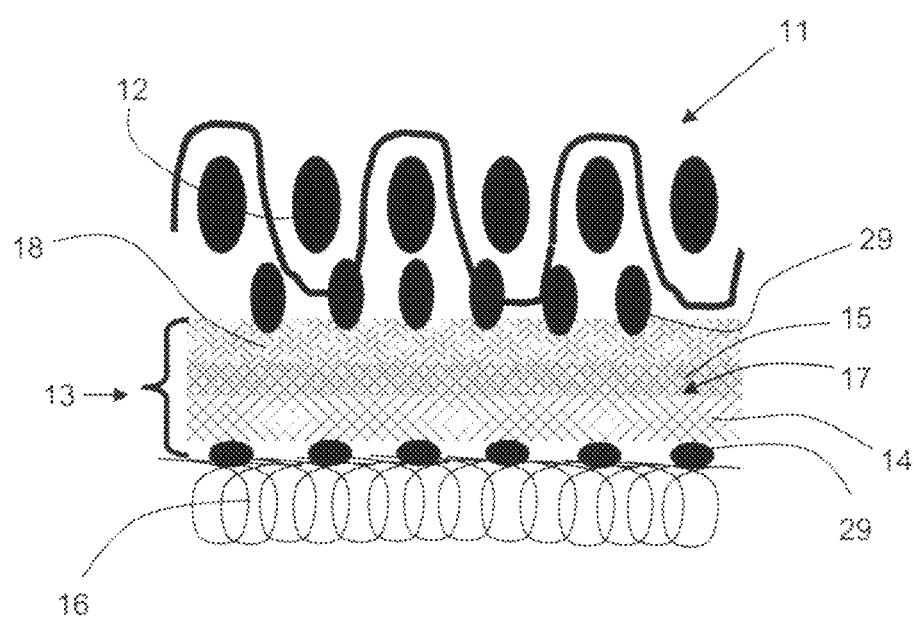
FIG. 4 is a cross-sectional schematic illustration of an exemplary embodiment of a fabric laminate.

In an exemplary embodiment illustrated in the schematic of FIG. 4 a construct is provided wherein the center layer or region (15) is depicted having a smaller or tighter pore size than the more open structure of the two outer layers or regions (14, 18) provided on either side of the center layer. In one embodiment, bubble points measured from individual layers of the same materials processed similarly to the outer two layers of the aggregate multilayered porous membrane structure, are lower than the bubble point of the individual layer of material that is similar to the center layer of the aggregate structure. By way of comparison, when the same three polymeric materials are integrated to form a multilayered asymmetric porous structure, in some embodiments the bubble point of an asymmetric porous membrane may be the same or even higher than the bubble point of the tightest individual structure. Among the advantages provided by the asymmetric porous membrane, the more open or larger pores size of the outer layer facilitates attachment of textile layers when using standard lamination procedure, where it is often difficult to laminate to a microstructure having little porosity for certain polymeric materials.

Garments, and more particularly garments for active use in wet conditions, may be exposed to a wide range of contaminants, including but not limited to, sebum, perspiration, laundry detergents, insects repellants, lotions, and fuels. These contaminants have a wide range of surface tensions. To evaluate the performance of various asymmetric porous membranes, and fabric laminate made with these asymmetric porous membranes, as well as comparative materials, samples were exposed to fluids with approximately 23 dynes/cm and approximately 31 dynes/cm surface tension. The fluid having approximately 23 dynes/cm surface tension was selected to represent commercially available laundry detergents, which have a range of surface tension generally from about 25 to 35 dynes/cm. The fluid having approximately 31 dynes/cm surface tension was selected to represent other potential contaminants including sebum which has a surface tension range that includes 31 dynes/cm.

Figure 9:
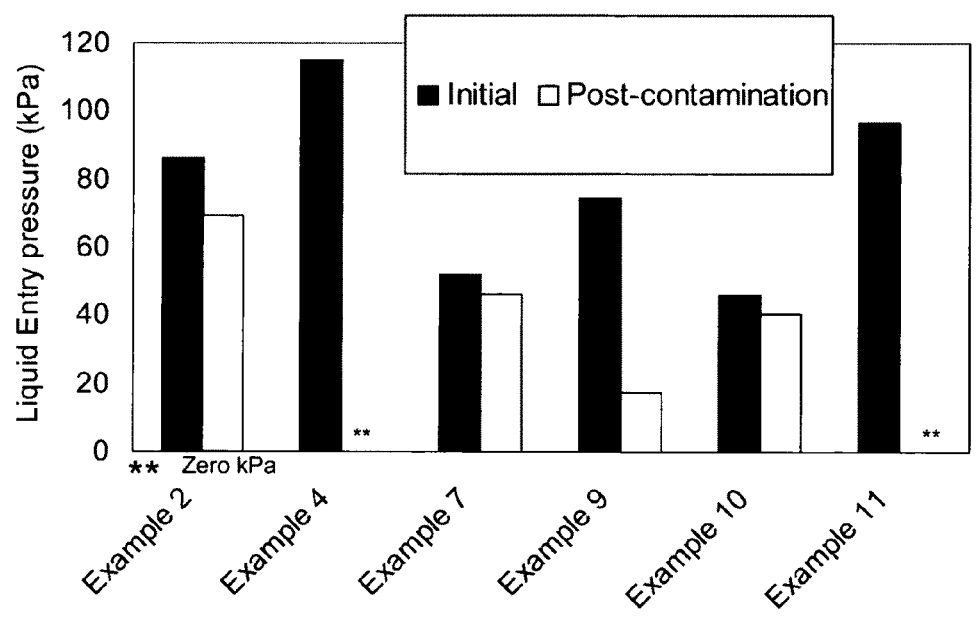
FIG. 9 is a bar graph comparing liquid entry pressures (LEP) of porous membrane structures to a 31 dynes/cm fluid before and after exposure to a low surface tension fluid.

It has been found that asymmetric membranes can provide more contamination resistance, for example, to sebum compared to homogeneous structures. It has also been found that asymmetric membranes made as described herein have both a high initial liquid entry pressure, and can advantageously sustain the high liquid entry pressure after exposure to low surface tension fluids. In comparison, homogeneous porous membrane structures cannot achieve both. For example, a homogeneous porous membrane structure having a higher initial entry pressure is unable to sustain this entry pressure upon exposure to low surface tension fluids. Other homogenous porous membrane structures that can sustain an initial entry pressure after exposure to low surface tension fluids disadvantageously have a lower initial entry pressure which may make them unsuitable for use in garment applications requiring high water resistance. In one embodiment, a fabric laminate comprising an asymmetric membrane having a liquid displacement pressure below the manual bubble point pressure, has an initial entry pressure greater than 75 kPa, and sustains more than 70% of the entry pressure after exposure to low surface tension fluid when tested according to the methods disclosed herein for Liquid Entry Pressure. In other embodiments, fabric laminates comprising an asymmetric membrane having a liquid displacement pressure below the manual bubble point pressure, have an initial entry pressure greater than 85 kPa, or greater than 95 kPa, and sustain more than 80% of the entry pressure after exposure to low surface tension fluid. As shown in FIG. 9, an asymmetric porous membrane having a liquid displacement pressure below the manual bubble point pressure has a higher initial liquid entry pressure and greater percent sustained entry pressure, when compared to some homogenous porous membranes. This unique combination of performance properties has not been demonstrated by a homogeneous porous membrane tested herein. This combination of properties of the asymmetric porous membrane, when used in the construction of a fabric laminate for use in a garment, provides the wearer with increased waterproof durability.

Asymmetric porous membranes take longer for contamination to penetrate the membrane and to be detected than homogeneous porous membrane structures, providing enhanced waterproof durability. In one embodiment, an asymmetric porous membrane has less than or equal to 50% detectable contamination penetration after about 900 seconds exposure to synthetic sebum when tested according to the method described here. In some embodiments, asymmetric porous membranes have less than or equal to about 75% detectable contamination penetration after approximately 4,000 seconds exposure to synthetic sebum. This increased time to contamination provides increased contamination resistance in a fabric laminate made into a garment.

Disadvantageously, it is known that when some air permeable garments comprising certain porous membranes become contaminated, permeation of liquid there through may occur. Surprisingly, it has been found that the liquid flow rate and in particular, the water flow rate through the asymmetric porous membranes described herein have significantly less than the water flow rate after contamination than a homogenous porous membrane. Therefore, in one embodiment, a garment constructed with an asymmetric porous membrane, provides the wearer with greater protection from rain should contamination occur.

While asymmetric porous membranes provide resistance to contamination with low surface tension fluids liquid contamination may be further minimized by rendering the structure oleophobic. An oleophobic coating may be provided to at least a portion of the multi-region or multilayer asymmetric porous membrane, for additional protection, or an oleophobic coating can be provided to the entire porous asymmetric structure or fabric laminate comprising the asymmetric porous structure. An oleophobic coating is herein defined as a treatment or coating that deposits an oleophobic material. Different types of oleophobic materials may be coated on different components of the fabric laminate, for example the porous membrane, a textile or portions of either. Examples of oleophobic materials suitable for use herein include fluoropolymers such as fluoroacrylates and other materials such as those disclosed or taught, for example, in U.S. patent application Ser. No. 11/440,870 and U.S. Pat. Nos. 5,539,072 and 5,460,872. When provided with an oleophobic coating or treatment, laminates may be formed that retain the air permeability while having an oil rating greater than or equal to about 4 when tested according to the Oil Repellency Test described herein. In other embodiments, laminates may be formed having an oil rating greater than or equal to about 5, or greater than or equal to about 6. It should be understood that other coatings, such as water repellent coatings, may be applied to one or more textile layers of the air permeable fabric laminate, including a hydrophobic or oleophobic treatment or coating.

The textile layer attached to the porous membrane of the fabric laminate is air permeable and may comprise a woven, knit or non-woven material, and it may be comprised of materials such as, but not limited to cotton, rayon, nylon and polyester, and blends thereof. It may be desirable to have either an outer or inner textile layer attached to the porous membrane, or both an outer and an inner textile layer with textile layers being attached to both sides of the porous membrane. The weight of the textile layer is not particularly limited except as required by the application. Optionally, the weight may be between about 10 gsm and 700 gsm (grams per square meter). In other embodiments the weight of the textile layer may be between 10 gsm and 500 gsm, or between 10 gsm and 200 gsm.

One or more textile layers (12, 16) may be coupled to the porous membrane by discontinuous attachments (29) as depicted in FIG. 2 and FIG. 3. Any suitable process for joining the outer textile layer, inner textile layer, and porous membrane may be used, such as gravure lamination, fusion bonding, adhesive web, spray adhesive bonding, and the like. Where gravure lamination is used, the adhesive may be applied discontinuously forming discontinuous attachments, such as by discrete dots or an adhesive web, to adhere layers together while optimally maintaining breathability, or moisture vapor transport, through the laminate. In some embodiments, an adhesive surface coverage of from about 5% up to about 80% may be used.

In certain applications such as apparel, it is important that the porous membrane have sufficient strength for use in fabric laminate constructions and do not compromise the integrity of the laminate. For example, where the porous membrane is a layered structure it is important that the layers of the membrane maintain integrity during use and care. One measure of the integrity of a structure is the Z-strength of the membrane in the thickness direction. Surprisingly, it has been found that the porous membranes made according to the methods taught herein have high Z-strength in the thickness direction of the membrane. In one embodiment it may be useful that the fabric laminate comprises a porous membrane that has a Z-strength greater than about 18N when tested according to the method described herein. In other embodiments, the Z-strength of the porous membrane is greater than about 25N, greater than about 35N, or between about 20N and about 70N, or between about 25N and 70N when tested according to the method described herein.

In some embodiments, it has been found that it is desirable to construct an article with a fabric laminate as described herein so that the porous membrane region having a more open structure, for example as determined by a comparison of the nodal density of each surface of the membrane, is positioned toward the source of contamination. Thus, in one embodiment, an article of apparel is constructed that comprises a fabric laminate comprising a textile laminated to an asymmetric porous membrane having a first porous membrane region having a greater nodal density than a second porous membrane region. In a further embodiment, the article of apparel is constructed so that the porous membrane region having the lower nodal density is oriented toward the body of the wearer, providing contamination resistance, for example, from sebum.

In one alternate embodiment, an air permeable fabric laminate may be formed comprising at least one textile layer attached to an asymmetric porous membrane that has at least two porous membrane layers that have different microstructures, wherein the porous membrane layers are joined together at an interface with a discontinuous adhesive. In a further embodiment, the fabric laminate comprises an asymmetric porous membrane that comprises at least three porous membrane layers joined together by a discontinuous adhesive at the interfaces, where the microstructure of the outer membrane layers have a larger pore size, or more open pore structure, than the porous membrane layer therebetween.

In some embodiments, the fabric laminate comprising an asymmetric porous membrane may be used for only a portion of an article of apparel, for example by incorporating one or more panels in a garment. The air permeable fabric laminate may be used as panels where the air permeability of the fabric laminate provides the wearer more comfort, while maintaining resistance to penetration by contaminants. As depicted in FIG. 1, the panels (75) are depicted as a portion of the garment (10).

In some embodiments the fabric laminate has a liquid entry pressure greater than about 70 kPa with a liquid having surface tension of about 31 dynes/cm, when tested according to the method described herein, Fabric laminates described herein are air permeable having a Gurley number less than 200 seconds, or less than 150 seconds, or less than 100 seconds, when tested according to the method described herein. In some embodiments, it may be desirable to have a fabric laminate that has a Gurley number of greater than 10 seconds where it is desirable to have good airflow to provide comfort to a wearer while minimizing the ingress of, for example, water or contaminants through the fabric laminate. In other embodiments, fabric laminates having a Gurley number between 10 and 100 seconds, or between 15 and 80 seconds may be suitable.

Fabric laminates described herein are breathable having a moisture vapor transmission rate (MVTR) that is greater than 1000 g/m²-24 hours, or greater than 5000 g/m²-24 hours, or greater than 10000 g/m²-24 hours, or greater than 15000 g/m²-24 hours, or greater 20000 g/m²-24 hours, when tested according to the method described herein.

TEST METHODS

Thickness Measurements

Membrane thickness was measured by placing the membrane between the two plates of a Kafer FZ1000/30 thickness snap gauge (Kafer Messuhrenfabrik GmbH, Villingen-Schwenningen, Germany). The average of the three measurements was used.

Mass Per Area

The mass per area of samples was measured according to the ASTM D 3776 (Standard Test Methods for Mass Per Unit Area (Weight) of Fabric) test method (Option C) using a Mettler-Toledo Scale, Model 1060. The scale was recalibrated prior to weighing specimens, and the results were reported in grams per square meter (gsm).

Density Measurements

Samples were die cut into 2.54 cm by 15.24 cm rectangles and were weighed using a Mettler-Toledo analytical balance modelAG204 to determine the sample's mass, and the thickness was determined using a Kafer FZ1000/30 snap gauge. Using this data, density was calculated with the following formula:

$$\rho = \frac{m}{w * l * t}$$

in which: $\rho$=density (g/cc); m=mass (g); w=width (cm); l=length (cm); and t=thickness (cm). The average of the three measurements was used.

Tensile Break Load Measurements and Matrix Tensile Strength (MTS) Calculations

Tensile break load was measured using an INSTRON 1122 tensile test machine equipped with flat-faced grips and a 0.445 kN load cell. The gauge length was 5.08 cm and the cross-head speed was 50.8 cm/min. The sample dimensions were 2.54 cm by 15.24 cm. For longitudinal MTS measurements, the larger dimension of the sample was oriented in the machine, or "down web," direction. For the transverse MTS measurements, the larger dimension of the sample was oriented perpendicular to the machine direction, also known as the cross web direction. Each sample was weighed using a Mettler Toledo Scale Model AG204, then the thickness of the samples was taken using the Kafer FZ1000/30 thickness snap gauge. The samples were then tested individually on the tensile tester. Three different sections of each sample were measured. The average of the three maximum load (i.e., the peak force) measurements was used. The longitudinal and transverse MTS were calculated using the following equation:

MTS=(maximum load/cross-section area)*(bulk density of PTFE)/density of the porous membrane), wherein the bulk density of PTFE is taken to be 2.2 g/cc.

Z-Strength

The Z-strength of the membranes was measured per TAPPI T-541 om-05 with the following modifications. The sample area was 0.713 cm² and a crosshead speed of 0.67 cm/sec was used. While samples were not conditioned prior to testing per TAPPI protocol, samples were heated at 49° C. for 20 minutes while held under 255 kPa of pressure to ensure good adhesion between the double sided tape and sample. Three samples were tested with the average maximum stress reported as the Z-strength.

SEM Sample Preparation Method

Cross-section SEM samples were prepared by spraying them with liquid nitrogen and then cutting them with a diamond knife in a Leica ultracut UCT, available from Leica Microsystems, Wetzlar, Germany.

Cross-Sectional SEM and Contrast (Gray Scale) Analysis

To ascertain the number of regions that exist in an asymmetric membrane, cross-sectional analysis of membrane samples and contrast (gray scale) of an SEM of a cross-sectional sample were analyzed. Cross-section samples were prepared as described in the SEM Sample Preparation Method. Scanning electron micrographs (SEM) were taken of the cross-sectional samples and observed for the presences of different regions and/or interfaces between the regions, indicating an asymmetric porous membrane structure.

The SEM image may be converted to a black and white image using the Image J software. The software used for grayscale analysis was Image J, version 1.43s, available from the National Institute of Health (http://rsb.info.nih.gov/ij). A graphical representation of the grayscale values of the cross-sectional area of the membrane sample was generated. For asymmetric membranes, an interface (FIGS. 8a and 8b, at 17) between regions of a porous membrane having different microstructures can be observed in the gray scale plot as a signal that is significantly different than the average gray scale value of the adjacent region.

SEM Surface Analysis for Nodal Density

SEM analysis may be used to detect differences in the microstructures of regions of a porous membrane. Scanning Electron Micrographs (SEMs) of the top and bottom surfaces of the porous membrane can be used to describe differences in microstructure by visually analyzing the nodal density of each surface.

The same preparation method and the same SEM instrument should be used for each surface of a porous membrane. For the purpose of analyzing the asymmetric porous membrane samples described herein, and for the purposes of calculating nodal density, a node is considered to be any point of connection for three or more fibrils.

The nodal density SEM analysis method involves two steps. In the first step, all visible nodes are marked. Nodes at the perimeter of the image are marked as long as they are fully within the field of view. The magnification of the SEM image should be selected such that at least 150 nodes are in each of the images being compared, while using the same magnification for each image. The number of nodes marked in each image is then divided by the area of the image, as determined by the scale provided by the SEM software. The results are calculated as nodal density per $\mu m^2$. The same person should analyze, mark and count the nodes in each image being compared.

Moisture Vapor Transmission Rate Test (MVTR)

The moisture vapor transmission rate for each sample was determined in accordance with ISO 15496 except that the sample water vapor transmission (WVP) was converted into MVTR moisture vapor transmission rate (MVTR) based on the apparatus water vapor transmission (WVPapp) and using the following conversion.

MVTR=(Delta $P$ value*24)/((1/WVP)+(1+WVPapp value))

The results are reported as $g/m^2$-24 hours.

Gurley Measurements

The Gurley air flow test measures the time in seconds for 100 $cm^3$ of air to flow through a 6.45 $cm^2$ sample at 12.4 cm of water pressure. The samples were measured in a Gurley Densometer Model 4340 Automatic Densometer. Articles possessing Gurley values less than about 2 seconds were submitted for Frazier number testing, since this test provides more reliable values for the characterization of highly permeable articles. The average of the three measurements was used.

Liquid Entry Pressure Measurement: Initial and Post-Contamination

Liquid entry pressure was measured and compared for non-contaminated samples to provide an initial value, as well as for contaminated samples to provide post-contamination values, using the following procedure.

The sample membrane is clamped in an in-line filter holder (Pall, 47 mm, part number 1235). On the one side of the sample membrane is a liquid that is able to be pressurized. On the other side of the sample membrane, which is open to atmospheric pressure, a piece of colored paper is placed between the sample membrane and a support (perforated plexiglass disk). The sample is then pressurized in 17 kPa increments, waiting 60 seconds after each pressure increase. The pressure that a color change in the paper occurs is recorded as the entry pressure. The liquid used is about 30% IPA-70% water (vol-vol), which results in a liquid surface tension of about 31 dynes/cm (+/–about 1) determined by pendant drop method. Two samples were measured and averaged to provide the initial liquid entry pressure ($EP_{initial}$).

To test for liquid entry pressure after contamination ($EP_{post\ contamination}$), samples were contaminated according to the Low Surface Tension Fluid Exposure procedure described herein, with an exposure time of about 8 hours, and then tested for liquid entry pressure to determine the % sustained entry pressure, calculated as follows:

% Entry Pressure Sustained=100*$EP_{post\ contamination}$/$EP_{initial}$

Water Flow Rate Measurement

The following procedure was used to measure the water flow rate through a membrane sample. The membrane was either draped across the tester (Sterifil Holder 47 mm Catalog Number: XX11J4750, Millipore) or cut to size and laid over the test plate. The membrane was first contaminated according to the Low Surface Tension Fluid Exposure procedure described herein, for 20 hours. The tester was filled with de-ionized water (room temperature). A pressure difference of 33.87 kPa was applied across the membrane; the time for 400 $cm^3$ of de-ionized water to flow through the membrane was measured. The average of the measurements for two samples was calculated.

Prior to contamination by the Low Surface Tension Fluid Exposure procedure described herein, samples were tested for water flow rate. A non-contaminated sample was considered hydrophobic if there was no detectable water flow after 30 minutes of testing.

Low Surface Tension Fluid Exposure Procedure

A low surface tension fluid is made by placing a powdered surfactant, made according to the procedure below, into reverse osmosis (RO) water at a concentration of 2 g/l. The resulting mixture has a surface tension of 23 dynes/cm (±3.5) at 25° C. Prior to exposure 1 gram/liter of squalene and 1 gram/liter of peanut oil are added to the surfactant/RO water mixture. 50 mL of the resulting fluid is placed into a 4 oz polyethylene container. The membrane sample is placed over the opening of the container and clamped in place. The container is then turned upside down so that the fluid is in contact with the membrane with a liquid height of 15 mm above the surface of the membrane. The exposure time is specified in the specific test method.

Synthesis of the powered surfactant was as follows:

1. 25 g of Oleic acid having a purity of about 98% or greater (Sigma Aldrich) was combined with 500 mL of RO Water in a 2 L beaker.

2. 5.55 g of NaOH was dissolved in 500 mL of RO water and added to the oleic acid-RO water mixture of step 1.
3. The mixture of step 2 was heated to 60° C. over 20 minutes while stirring, then held at 60° C. for an additional 20 minutes.
4. The resulting clear solution was cooled from 60° C. to 25° C. and then frozen for 24 hours at −10° C. to precipitate surfactant from solution.
5. The precipitated solution of step 4 was brought to 25° C., and then the water was drained from precipitated surfactant and placed in a vacuum oven at 30° C. for 24 hours to completely remove water from the surfactant product.
6. The dried surfactant was ground to a fine powder using a mortar and pestle.
7. The product, a powdered surfactant, was stored at −10° C. The product of the above synthesis when combined with RO water to form a stable emulsion that has a critical micelle concentration (CMC) of approximately 0.70 g/L. At a concentration of 2 g/L the surface tension of the emulsion is 23 dynes/cm (±3.5) at 25° C. Verification of the surface tension of the emulsion was measured using the pendant drop method.

Synthetic Sebum Contamination Procedure:

A 21 gram/square meter ePTFE membrane made according to Membrane Example 7 was imbibed on a roll-to-roll coater with the oil mixture described below to achieve a coating weight of 15 grams/square meter to form a synthetic sebum sponge. The synthetic sebum sponge was brought into contact with a 38 μm thick polyethylene terephthalate (PET) film backer, rolled onto a 7.6 cm core and stored at −10° C.

The synthetic sebum contained the following components:

| Material | Volume % |
| --- | --- |
| Peanut oil | 41 |
| Light white mineral oil | 31 |
| Squalene | 16 |
| 2-nonanone | 12 |

Figure 10A:
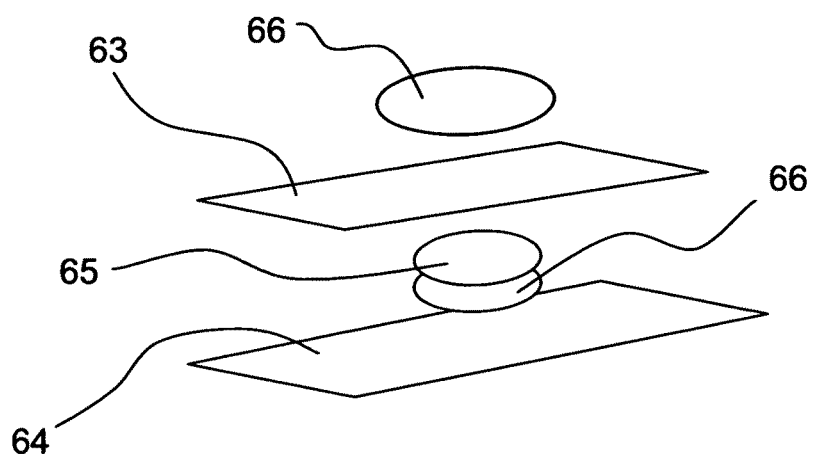
FIG. 10a is a schematic representation of the procedure set up for the Synthetic Sebum Contamination Procedure.

Immediately prior to use, four layers of the synthetic sebum sponge (65) were arranged in a stack on a single 38 μm thick PET film backer (66) cut into 18 mm diameter discs using a hand punch, and placed on a glass microscope (64) slide with the film backer facing the slide, as illustrated in FIG. 10a.

A sample of a membrane (63) was placed on top of the synthetic sebum sponge (65), and then a circular glass cover slide (66) of 25 mm diameter and a glass slide (64) was placed on top of the membrane to form a stack as depicted in FIG. 10a. The stack was then placed on a preheated flat 12 mm thick steel plate and placed in an oven set to 37° C. with a 1 kg weight placed over the cover slide. The membrane sample was observed periodically by removing the 1 kg weight and taking micrographs using an optical microscope in reflectance mode to assess the amount of penetration of the synthetic sebum through the thickness of the membrane sample. A micrograph (67) of a test sample is shown is FIG. 10b, having white areas (68) and dark areas (69). Penetration of synthetic sebum contamination was reported as percent contamination for a specified time interval.

To determine percent penetration of the synthetic sebum contaminant, the grayscale micrographs were processed as follows. The grayscale image was converted to a black and white image using the thresholding function of an image analysis software package. The thresholding function was used to separate the lighter grayscale intensity pixels (which represented portions of the sample that were uncontaminated) from the darker grayscale intensity pixels (which represented portions of the sample that were penetrated by the contaminant). The bimodal histogram of grayscale intensity in the exposed region was evaluated, and a threshold value between the two populations was chosen, assigning "white" to values below the threshold and "black" to those above. The image analysis software was then used to count the numbers of white and black pixels in the exposed region. The percent penetration by synthetic sebum was then calculated as the ratio of black pixels to total pixels (black plus white pixels) multiplied by 100.

Figure 10B:
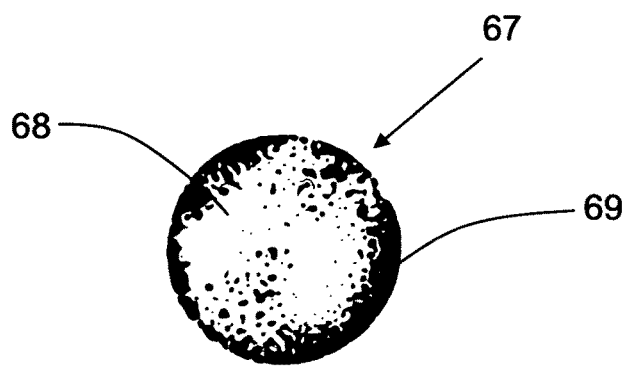
FIG. 10b is a representation of penetration of synthetic sebum contamination through a membrane.

An example of penetration of synthetic sebum through a membrane sample as detected by a darkening of the sample when viewed by optical microscopy is shown in FIG. 10b (300 seconds; 5 minutes). The time intervals at which the sample membranes were observed were about 300 seconds, about 1200 seconds, 5700 seconds, 12900 seconds, 27300 seconds and 77700 seconds. The percent of synthetic sebum contamination of the disc area was then plotted as function of time to assess the relative contamination resistance of the membrane samples.

Automated Bubble Point Measurement

The bubble point and mean flow pore size were measured according to the general teachings of ASTM F31 6-03 using a Capillary Flow Porometer (Model CFP 1500 AEXL from Porous Materials Inc., Ithaca, N.Y.). A sample membrane was placed into the sample chamber and wet with SilWick Silicone Liquid (available from Porous Materials, Inc.) having a surface tension of 19.1 dynes/cm. The bottom clamp of the sample chamber has a 2.54 cm diameter, 3.175 mm thick porous metal disc insert (Mott Metallurgical, Farmington, Conn., 40 micron porous metal disk) and the top clamp of the sample chamber had a 3.175 mm diameter hole.

The samples herein were tested and analyzed using the Capwin software version 6.71.94, and the following parameters were set as specified as follows:

| Parameter | Set Point |
| --- | --- |
| maxflow (cc/m) | 200000 |
| bublflow (cc/m) | 100 |
| F/PT (old bubltime) | 50 |
| minbppres (PSI) | 0 |
| zerotime (sec) | 1 |
| v2incr (cts) | 10 |
| preginc (cts) | 1 |
| pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 3 |
| aveiter | 20 |
| maxpdif (PSI) | 0.1 |
| maxfdif (cc/m) | 50 |
| sartp (PSI) | 1 |
| sartf (cc/m) | 500 |

One skilled in the art would understand that some modifications to software and test parameters would be suitable for conducting the automated bubble point measurements described and reported herein.

Liquid Displacement Pressure (LDP) and Manual Bubble Point Pressure Test Methods A manual bubble point test was run to determine the presence of asymmetric regions through the thickness of a membrane or fabric laminate sample.

A manual bubble point test was run according to the general teaching of ASTM F31 6-03. The bubble point is considered the lowest pressure at which a continuous stream of bubbles (also referred to as the visible bubble point indication) were observed rising from the sample. An opaque or white membrane sample was wet with a wetting liquid such as isopropyl alcohol (IPA) until the sample became transparent or translucent. The membrane sample was placed into a filter holder to secure the sample, and an additional amount of IPA was added to the holder.

A first side of the sample was facing the gas pressure and was subjected to increasing gas pressure while the second side of the sample was visually monitored with the unaided eye as the gas pressure was increased. The sample was observed for a change in opacity, for example, a change from transparent or translucent to white or opaque, as the gas pressure was increased. It is believed that the change in opacity indicates that IPA was displaced from the pores of a more open region of the asymmetric membrane. The pressure at which the sample has a change in opacity is referred to as the "liquid displacement" pressure (LDP). The liquid displacement pressure and the bubble point were recorded.

If no change in opacity is observed, or if a visible bubble point indication was observed prior to a change in opacity, the test was repeated with the second side of the sample being subjected to increasing gas pressure. The liquid displacement pressure, if observed and the visible bubble point indication pressure were recorded.

A porous membrane sample that has an LDP lower than the visible bubble point indication pressure is considered as having an asymmetric structure wherein an outermost region or layer in the thickness direction of the membrane has a microstructure that is more open, or has a lower nodal density, than one other layer or region.

For purposes herein, where the asymmetric membrane sample comprises at least two regions having different microstructures, where the region having a tighter microstructure is facing the top of the test fixture and the region of the porous membrane sample having the more open microstructure is facing the bottom of the test fixture or subjected to increasing gas pressure, a change in opacity will be observed as the liquid is removed from the wetted sample. The change in opacity will be observed at a pressure that is lower than the bubble point pressure of the sample, indicating that the sample has an asymmetric structure. By way of comparison, an expanded PTFE membrane having a homogeneous structure throughout the thickness of the ePTFE membrane becomes transparent or translucent when wet with IPA, and as the gas pressure of the fixture reaches the bubble point pressure, small gas bubbles are observed forming on the top face of the still translucent sample; the gas bubbles beginning to stream up from the top surface as the pressure is further increased. The ePTFE membrane having a homogeneous structure throughout the thickness stays translucent up to at least the pressure at which the bubble point is detected.

Fabric laminate samples having one or more textile layers attached to a membrane can also be tested. If the change in opacity indicating liquid displacement cannot be detected through the fabric by the unaided eye, a visual aid such as a microscope may be employed. Alternatively, the fabric can be removed from the membrane prior to analysis according to the test method described herein.

Oil Repellency Measurement

Oil rating of both membranes and fabric laminates were measured using the AATCC Test Method 118-1997. The oil rating of a membrane sample is the lower of the two ratings obtained when testing the two sides of the membrane; for fabric laminates, the oil rating is tested on the exposed membrane side of the fabric laminate. A higher the oil rating number indicates a better the oil repellency.

EXAMPLES

Tape 1

Fine powder of PTFE polymer (DuPont, Wilmington, Del.) was blended with Isopar K (Exxon Mobil Corp., Fairfax, Va.) in the proportion of 0.210 g/g of fine powder. The lubricated powder was compressed in a cylinder to form a pellet and placed into an oven set at 49° C. for approximately 8 hours. The compressed and heated pellet was ram extruded to produce an extrudate tape approximately 15.2 cm wide by 0.75 mm thick. The tape was then calendered between compression rolls, set to a temperature of 38° C., to a thickness of 0.28 mm. The process produced a calendered tape.

Tape 2

Fine powder of PTFE polymer as described and taught in U.S. Pat. No. 6,541,589, comprising perfluorobutylethylene modifier, was blended with Isopar K (Exxon Mobil Corp., Fairfax, Va.) in the proportion of 0.243 g/g of fine powder. The lubricated powder was compressed in a cylinder to form a pellet and placed into an oven set at 49° C. for approximately 8 hours. The compressed and heated pellet was ram extruded to produce an extrudate tape approximately 15.2 cm wide by 0.75 mm thick. The tape was then calendered between compression rolls, set to a temperature of 38° C., to a thickness of 0.28 mm. The process produced calendered tape.

Example 1

A 15 gsm two-layer composite membrane was made by calendering together a layer of tape as described in the Tape 1 example and a layer of tape as described in the Tape 2 example. The two tapes were layered and calendered together between compression rolls, set to a temperature of 38° C., to a thickness of 0.22 mm.

The layered calendered tape was then transversely stretched to 60 cm, and dried in an oven set at 250° C. The dry tape was longitudinally expanded 1.4:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds. A membrane sample made according to this example was tested for nodal density according to the test method described herein, and as depicted in FIGS. 5a and 5b. The membrane was analyzed at 5 k magnification. The first side of the membrane sample corresponding to Tape Example 1 had a nodal density of 1.5 nodes per $\mu m^2$ and the second side of the membrane sample corresponding to Tape Example 2 had a nodal density of 2.1 nodes per $\mu m^2$, the second side having a nodal density that was measured to be about 40% greater than the first side of the membrane sample.

The membrane was tested according to the test methods described herein; properties and testing results are reported in Tables 1 and 3. The membrane was also tested according to the Liquid Displacement Pressure and Manual Bubble Point Pressure Test Method. When tested for LDP, no LDP was detected when the higher nodal density side was toward the gas pressure; the sample was reversed and an LDP was detected when the lower nodal density side was facing the gas pressure, indicating an asymmetric structure.

A membrane made according to Example 1 having an LDP of 131 kPa had a Z-strength of 40N, compared to multilayer membranes of Comparative Examples 12-14 which had an LDP of less than 3 kPa and a Z-strength of 18N or less.

Example 2

A 23 gsm three-layer composite membrane was made by calendering a layer of tape as described in the Tape 2 example between layers of tape as described in the Tape 1 example. The three tapes were layered and calendered together between compression rolls, set to a temperature of 38° C., to a thickness of 0.43 mm. The layered calendered tape was then transversely stretched to 62 cm, and dried in an oven set at 250° C. The dry tape was longitudinally expanded 2:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds.

The process produced a thin strong porous membrane. The membrane was tested for water flow according to the test described herein; the sample was considered hydrophobic since after 30 minutes there was no detectable water flow.

Samples made according to this example were tested according to the methods described herein, the results of which are reported in Tables 1 and 3. A membrane made according to Example 2 having an LDP of 169 kPa and had a Z-strength of 51N, compared to multilayer membranes of Comparative Examples 12-14 which had an LDP of less than 3 kPa and a Z-strength of 18N or less.

An SEM of a cross-section of a porous membrane made according to this example was taken, as seen in FIG. 7. The SEM depicts regions of a three-layer porous membrane (25) made according to this example where in at least one of the porous membrane regions (26) has a microstructure that is different than the other porous membrane regions (27, 28). The cross-sectional SEM was analyzed according to the Contrast (Gray Scale) analysis test method, the results of which can be seen in FIG. 8*b*, which show a signal change (33) that is greater than the average signal variation of each region.

The 23 gsm membrane made according to this example comprising both the components of Tape 1 and Tape 2, was compared to membranes made from one layer of the Tape 1 material (Comparative Example 7), and membranes made from one layer of the Tape 2 material (Comparative Example 9) for initial Liquid Entry Pressure, and liquid entry pressure after exposure to low surface tension fluids; the results can be seen in FIG. 9 and in Table 3. Membranes made according to this example had a higher initial liquid entry pressure than Comparative Examples 7 and 9, and a higher liquid entry pressure after exposure to the low surface tension fluid (i.e., about 87% sustained liquid entry pressure).

Figure 11:
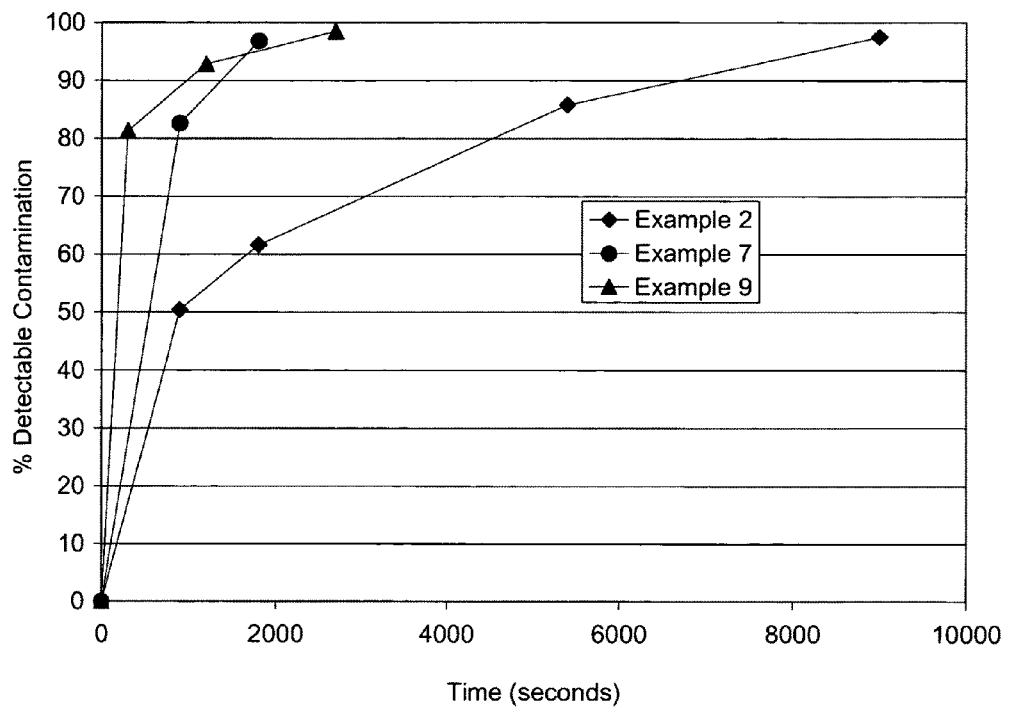
FIG. 11 is a graph depicting percent detectable synthetic sebum contamination vs. time (in seconds) for membranes structures.

In the graphical representation of FIG. 11, an asymmetric porous membrane made according to this examples had less than or equal to about 50% detectable contamination after approximately 900 seconds exposure to synthetic sebum. In comparison, homogeneous porous membranes of Examples 7 and 9 have more detectable penetration by contaminants in the same period of time.

Example 3

A 31 gsm three-layer composite membrane was made by calendering a layer of tape as described in the Tape 2 example between layers of tape as described in the Tape 1 example. The three tapes were layered and calendered together between compression rolls, set to a temperature of 38° C., to a thickness of 0.43 mm. The layered calendered tape was then transversely stretched to 62 cm, and dried in an oven set at 250° C. The dry tape was longitudinally expanded 1.5:1 at a temperature of approximately 300° C. The longitudinally expanded tape was then expanded transversely at a temperature of approximately 250° C. to approximately 1.8 m and then constrained and heated in an oven set at approximately 375° C. for approximately 12 seconds. The process produced a thin strong porous membrane.

The 31 gsm membrane made according to this example comprising both the components of Tape 1 and Tape 2, was tested according to the methods described herein. The properties and testing results are reported in Table 1.

Example 4

A 22 gsm three-layer composite membrane was made by calendering a layer of tape as described in the Tape 1 example between layers of tape as described in the Tape 2 example. The three tapes were layered and calendered together between compression rolls, set to a temperature of 38° C., to a thickness of 0.43 mm. The layered calendered tape was then transversely stretched to 60 cm, and dried in an oven set at 250° C. The dry tape was longitudinally expanded 2:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds. The process produced a thin strong porous membrane.

The 22 gsm membrane made according to this example comprising both the components of Tape 1 and Tape 2, was tested according to the test methods described herein. The sample did not exhibit an LDP. The sample had a high initial liquid entry pressure (FIG. 11), but after exposure to low surface tension fluid had an entry pressure of about zero (i.e., 0% sustained entry pressure). Membranes made according to this example contaminated faster than the membranes of Example 2, having 50% detectable contamination within 250 seconds.

The properties and testing results are reported in Tables 1 and 3.

Example 5

A 31 gsm five-layer composite membrane was made by calendering layers of tape of both the Tape 1 example and the Tape 2 example. Five layers of tape were calendered together as follows. Three layers of tape were calendered together by calendering a layer of tape as described in the Tape 1 example between layers of tape described in the Tape 2 example. The three tapes were layered and calendered together between compression rolls, set to a temperature of 38° C., to a thickness of 0.43 mm. Next, the three layered calendered tape was further layered between layers of tape made according to the Tape 1 example and calendered between compression rolls, set to a temperature of 38° C., to a thickness of 0.43 mm. This five layer calendered tape was then transversely stretched to 60 cm, and dried in an oven set at 250° C. The dry tape was longitudinally expanded 2:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds. The process produced a thin strong porous membrane.

Samples made according to this example were tested according to the methods described herein; the results are reported in Tables 1 and 3. A membrane made according to Example 5 having an LDP of 210 kPa and had a Z-strength of 44N, compared to multilayer membranes of Comparative Examples 12-14 which had an LDP of less than 3 kPa and a Z-strength 18N or less.

TABLE 1

Membrane Properties

| Membrane Property | Example 1 | Example 2 | Example 3 | Example 4 | Example 5 |
|---|---|---|---|---|---|
| density (g/cc) | 0.51 | 0.47 | 0.50 | 0.55 | 0.50 |
| thickness (mm) | 0.028 | 0.047 | 0.061 | 0.041 | 0.061 |
| longitudinal MTS (MPa) | 61 | 74 | 59 | 87 | 99 |
| transverse MTS (MPa) | 91 | 95 | 97 | 128 | 100 |
| Gurley Number (sec) | 9 | 20 | 23 | 21 | 23 |
| Bubble point (kPa) | 279 | 375 | 347 | 367 | 392 |
| Mass/Area (gsm) | 15 | 23 | 31 | 22 | 30 |
| mean flow pore size (microns) | 0.15 | 0.14 | 0.16 | 0.10 | 0.09 |
| Z-Strength (N) | 40 | 51 | 53 | 31 | 44 |

Comparative Example 6

A single layer 7 gsm membrane was made from the tape of the Tape 1 example. The tape made according to the Tape 1 example was calendered between compression rolls, set to a temperature of 38° C., to a thickness of 0.14 mm. The tape was then transversely stretched to 62 cm, and dried in an oven set at 250° C. The dry tape was longitudinally expanded 2:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds.

The process produced a thin strong porous membrane. Samples made according to this example were tested according to the methods disclosed herein; the results are reported in Table 2.

Comparative Example 7

A single layer 25 gsm membrane was made from the tape of the Tape 1 example. The tape was transversely stretched to 60 cm, and dried in an oven set at 250° C. The dry tape was longitudinally expanded 1.2:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds.

The process produced a thin strong porous membrane. Samples made according to this example were tested according the methods disclosed herein, the results of which are reported in Tables 2 and 3. The membrane was tested for water flow according to the test described herein; the sample was considered hydrophobic since after 30 minutes there was no detectable water flow. Membranes made according to this example had a low initial entry pressure, about 52 kPa (FIG. 9). Membranes made according to this example contaminated faster than the membranes of Example 2, having 50% detectable contamination within 550 seconds, and 75% detectable contamination within about 1000 seconds (FIG. 11).

Comparative Example 8

A single layer 7 gsm membrane was made from the tape of the Tape 2 example. The tape made according to Tape 2 was then calendered between compression rolls, set to a temperature of 38° C., to a thickness of 0.14 mm. The tape was then transversely stretched to 60 cm, and dried in an oven set at 250° C. The dry tape was longitudinally expanded 2:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds. The process produced a thin strong porous membrane.

Samples made according to this example were tested according the methods disclosed herein, the results of which are reported in Table 2.

Comparative Example 9

A single layer 21 gsm membrane was made from the tape of the Tape 2 example. The tape was then transversely stretched to 60 cm, and dried in an oven set at 250° C. The dry tape was longitudinally expanded 1.2:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds. The process produced a thin strong porous membrane.

Samples made according to this example were tested, the results of which are reported in Tables 2 and 3. Membranes made according to this example had a high initial entry pressure, but were unable to sustain entry pressure upon exposure to low surface tension fluid (FIG. 9). Membranes made according to this example contaminated faster than the membranes of Example 2, having 50% detectable contamination within 200 seconds, and 75% detectable contamination within about 250 seconds (FIG. 11).

Comparative Example 10

A three layer 28 gsm membrane was made from three layers of the tape of Tape 1. Three layers of tape as described in Tape Example 1 were calendered together. The three tapes were layered and calendered together between compression rolls, set to a temperature of 38° C., to a thickness of 0.43 mm. The layered calendered tape was then transversely stretched to 60 cm, and dried in an oven set at 250° C. The dry tape was longitudinally expanded 1.85:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds. The process produced a thin strong porous membrane.

Samples made according to this example were tested according the methods disclosed herein, the results of which are reported in Tables 2 and 3. Though the membrane made according to this example was constructed from three tapes, the structure appeared homogenous and did not exhibit an LDP. The sample had low initial liquid entry pressure, i.e. 55 kPa.

Comparative Example 11

A three layer 21 gsm membrane was made from three layers of Tape 2. Three layers of tape as described in the Tape 2 example were calendered together. The three tapes were layered and calendered together between compression rolls, set to a temperature of 38° C., to a thickness of 0.43 mm. The layered calendered tape was then transversely stretched to 60 cm, and dried in an oven set at 250° C. The dry tape was longitudinally expanded 1.83:1 at a temperature of approximately 300° C. The longitudinally expanded tape was then expanded transversely at a temperature of approximately 250° C. to approximately 1.8 m and then constrained and heated in an oven set at approximately 375° C. for approximately 8 seconds. The process produced a thin strong porous membrane.

Samples made according to this example were tested according the methods disclosed herein, the results of which are reported in Tables 2 and 3. Though the membrane made according to this example was constructed from three tapes, the structure appeared homogenous and did not exhibit an LDP. The sample did not sustain the initial entry pressure after exposure to low surface tension fluid.

TABLE 2

| Membrane Property | Example 6 | Example 7 | Example 8 | Example 9 | Example 10 | Example 11 |
|---|---|---|---|---|---|---|
| density (g/cc) | 0.51 | 0.49 | 0.67 | 0.66 | 0.48 | 0.62 |
| thickness (mm) | 0.013 | 0.050 | 0.010 | 0.030 | 0.060 | 0.030 |
| longitudinal MTS (MPa) | 47 | 32 | 64 | 50 | 75 | 102 |
| transverse MTS (MPa) | 56 | 102 | 92 | 159 | 84 | 133 |
| Gurley Number (sec) | 2 | 9 | 5 | 17 | 13 | 23 |
| Bubble point (kPa) | 140 | 153 | 250 | 283 | 241 | 372 |
| Mass/Area (gsm) | 7 | 25 | 7 | 21 | 28 | 21 |
| mean flow pore size (microns) | 0.29 | 0.23 | 0.18 | 0.13 | 0.13 | 0.09 |
| Z-Strength (N) | — | 53 | — | 111 | 31 | 80 |

TABLE 3

| Membrane Example | Time to 50% Contamination (sec) | Entry Pressure (kPa) | % Entry Pressure Sustained | Water flow post-contamination (cm3/sec) | (LDP) Liquid Displacement Pressure (kPa) | (BP) Bubble Point Pressure (kPa) | BP-LDP |
|---|---|---|---|---|---|---|---|
| 1 | — | 86 | — | — | 131 | 234 | 103 |
| 2 | 900 | 86 | 87% | 0.30 | 169 | 393 | 224 |
| 4 | 250 | 114 | 0% | 0.35 | * | 372 | — |
| 5 | — | 103 | — | 0.13 | 210 | 396 | 186 |
| 7 | 550 | 52 | 89% | 1.36 | * | 124 | — |
| 9 | 200 | 76 | 24% | 0.70 | * | 228 | — |
| 10 | 700 | 55 | 88% | 0.60 | * | 241 | — |
| 11 | 450 | 103 | 0% | 0.35 | * | 372 | — |

* None detected.

As shown in Table 3, only the asymmetric porous membrane examples had an LDP. Example 2 had the longest time to 50% contamination. The asymmetric porous membrane of example 2 had among the highest entry pressure of the samples tested and among the highest % entry pressure sustained, and therefore the highest entry pressure after contamination, when tested according to the low surface tension fluid exposure test describe herein. After the samples were contaminated per the low surface tension fluid exposure test describe herein, the water flow through sample 2 was among the lowest of the samples tested.

Comparative Example 12-14

Highly air permeable multilayered membrane structures that are made for use in liquid filtration applications, were tested in a hydrophobic form, and compared to the asymmetric structures described herein. Specifically, three three-layer membranes were obtained (Examples 12, 13, and 14). Each membrane was made by layering three polytetrafluoroethylene (PTFE) components that were co-expanded. The membranes were tested according the methods disclosed herein, and compared to the asymmetric porous membrane samples made according to the examples described herein. Properties and test results of the Comparative Examples are reported in Table 4.

TABLE 4

| Example | Mass (gsm) | Gurley (sec) | Z-strength (N) | (BP) Bubble Point Pressure (kPa) | BP-LDP |
|---|---|---|---|---|---|
| 12 | 16 | 0.6 | 18 | 152 | ~150 |
| 13 | 18 | 1 | 13 | 269 | ~267 |
| 14 | 21 | 2.6 | 4 | 290 | ~288 |

As shown in Table 4, the comparative examples 12 through 14 each had a low LDP (approximately less than 3 kPa), a low Gurley number, and a Z-Strength that was substantially lower than the examples shown in Table 1.

Samples of membranes made according to Examples 1, 2, 7, 9 and 10 described above were provided with an oleophobic coating (C1 and/or C2) as detailed below, and tested for oil rating and entry pressure. The results are reported in Table 5.

Oleophobic Coating 1 (C1)

Porous membranes, or the porous membrane side of a fabric laminate having a textile layer attached to the porous membrane, were coated with 2-propanol (Sigma-Aldrich Chemical Corporation, St. Louis, Mo.) so that the membrane was completely wet, preferably wetting both the surface and into the structure of the membrane. After wetting, it was immediately (in less than about 30 seconds) coated with a fluoropolymer solution, formulated by mixing about 6.0 g of fluorocarbon (AG8025, Asahi Glass, Japan) in about 14.0 g of deionized water. The membrane was hand coated with the mixture using a roller to a coating weight of approximately 3 g/m$^2$. The coated laminate was cured at about 180° C. for about 2 minutes.

Oleophobic Coating 2 (C2)

The porous membrane, and or the porous membrane side of a fabric laminate having a textile attached to the porous membrane, was rendered oleophobic by coating the membrane with about 2.5% solution of Teflon® AF (DuPont Fluoropolymers, Wilmington, Del.) in Fluorinert® FC-40 (3M Corporation, Minneapolis, Minn.) solvent. The membrane surface was hand coated using a roller to a coating weight of approximately 3 g/m$^2$, and dried at about 80° C. for about 2 minutes.

TABLE 5

| Example Number | Coating | Oil Rating | Entry pressure (kPa) | Gurley (sec) | Z-strength (N) |
|---|---|---|---|---|---|
| 1 | none | 0 | 86 | 9 | 40 |
|   | C1 | 6 | 86 | 21 | — |
| 2 | none | 0 | 97 | 20 | 51 |
|   | C1 | 6 | 103 | 25 | 47 |
|   | C2 | 6 | 207 | — | — |
| 7 | none | 0 | 52 | 9 | 53 |
|   | C1 | 6 | 69 | 16 | — |
| 9 | none | 0 | 76 | 17 | 111 |
|   | C1 | 6 | 86 | 25 | — |

TABLE 5-continued

| Example Number | Coating | Oil Rating | Entry pressure (kPa) | Gurley (sec) | Z-strength (N) |
|---|---|---|---|---|---|
| 10 | none | 0 | 55 | 13 | 31 |
|   | C1 | 6 | 97 | 21 | — |
| 11 | none | 0 | 103 | 23 | 80 |
|   | C1 | 6 | 117 | 32 | — |

As shown in Table 5, the addition of the oleophobic coating increased the oil rating of the samples tested without decreasing the liquid entry pressure of the sample|, the Gurley or the Z-strength. |$_{[KS1]}$ Air permeable fabric laminates were made by laminating a textile with a membrane prepared according to some of the Examples described above.

A two-layer laminate was formed comprising a membrane and a textile laminated to one side of the membrane. The textile was a woven nylon 6 textile comprised of yarns weighing 85 gsm (available from Milliken and Company (Spartanburg, S.C.; Style #131859).

Example 15

An air permeable two layer air permeable fabric laminate was formed comprising an asymmetric membrane and a textile laminated to one side of the membrane as described in Example 2.

The woven nylon textile described above was laminated to the membrane of Example 2. The membrane and textile were laminated together by gravure printing a dot pattern of moisture curable polyurethane adhesive onto the membrane surface. The adhesive was prepared according to the teachings of U.S. Pat. No. 4,532,316, and the adhesive covered approximately 35% of the membrane surface. The adhesive-printed side of the ePTFE membrane was pressed to one side of the woven textile in a nip roll and then passed over a heated roll to form a two layer laminate. The moisture cure adhesive was allowed to cure for 48 hours. A fabric laminate was made that had a weight of 95 gsm.

The fabric laminate was tested with no oleophobic coating according to methods described herein, the results of which are reported in Table 6. The fabric laminate was tested for LDP, and the sample was observed to turn opaque indicating liquid displacement at a pressure of 206 kPa. The bubble point (BP) was measured by the manual bubble point test and determined to be 345 kPa. The difference between the LDP and the BP was 139 kPa.

The liquid entry pressure of the sample was tested both before and after exposure to low surface tension fluid, the results of which are reported in Table 6. The membrane had a liquid entry pressure of 85.5 kPa after exposure, sustaining 83% of the initial entry pressure.

Further, a sample of this fabric laminate was rendered oleophobic by applying oleophobic coating C1 to the ePTFE side of the fabric laminate providing a fabric laminate with a weight of 97 gsm. A second sample of this fabric laminate was rendered oleophobic by applying oleophobic coating C2 to the ePTFE side of the fabric laminate. The samples were tested according the methods disclosed herein; results are shown in Table 6. Fabric laminates provided with an oleophobic coating maintained high MVTR and did not show a decrease in liquid entry pressure.

Example 16

An air permeable two layer laminate was formed comprising an asymmetric membrane of Example 7, and the woven nylon textile described above in a manner substantially according to Example 15. A fabric laminate was made that had a weight of 97 gsm.

The fabric laminate was tested according to methods described herein, the results of which are reported in Table 6. The fabric laminate was tested for LDP; the sample did not turn opaque prior to the manual bubble point pressure indicating that the sample was homogeneous. Further, a sample of this fabric laminate was rendered oleophobic by applying oleophobic coating C1 to the ePTFE side of the fabric laminate. The sample was tested according the methods disclosed herein, and had low initial liquid entry pressure.

Example 17

An air permeable two layer fabric laminate was formed comprising an asymmetric membrane of Example 9 and the woven nylon textile described above in a manner substantially according to Example 15. The fabric laminate was tested according to methods described herein, the results of which are reported in Table 6

A fabric laminate was made that had a weight of 94 gsm. The fabric laminate was tested for LDP; the sample did not turn opaque prior to the manual bubble point pressure indicating that the sample was homogeneous.

TABLE 6

| Example Number | Coating | Oil Rating | Gurley (sec) | MVTR (g/m² 2-24 hr) | Entry pressure (kPa) | % Entry pressure sustained |
|---|---|---|---|---|---|---|
| 15 | none | 0 | 50 | 17,400 | 103 | 83% |
|  | C1 | 6 | 58 | 17,200 | 103 | — |
|  | C2 | 6 | — | — | 207 | — |
| 16 | none | 0 | 35 | 19,100 | 69 | 90% |
|  | C1 | 6 | — | — | 69 | — |
| 17 | none | 0 | 45 | 20,100 | 86 | 31% |
|  | C1 | 6 | — | — | 86 | — |

As shown in Table 6, the fabric laminate sample made with an asymmetric porous membrane, Example 15, showed an LDP. In addition, as shown in Table 6, Example 15 had the highest entry pressure of the samples tested and maintained greater than 80% of the initial entry pressure after exposure to low surface tension fluid. The addition of the oleophobic coating increased the oil rating of the samples tested. The addition of the oleophobic coating did not impact the Gurley of the laminate. Of the oleophobic fabric laminate samples, Example 15 had the highest liquid entry pressure.

We claim:

1. An air permeable fabric laminate comprising:
   a. a hydrophobic asymmetric porous membrane comprising:
      i. a first porous fluoropolymer membrane region having a first microstructure, and
      ii. a second porous fluoropolymer membrane region having second microstructure, and
   b. a textile attached by discontinuous attachments to the second porous fluoropolymer membrane region on a side opposite the first porous fluoropolymer membrane region,
      wherein said first microstructure is a homogenous microstructure throughout said first porous fluoropolymer membrane region,
      wherein said second microstructure is a homogenous microstructure throughout said second porous fluoropolymer membrane region, and said second microstructure is different than the first microstructure and said first microstructure is a tighter microstructure than said second microstructure, and
   wherein the air permeable fabric laminate shows a change in opacity at a pressure of at least 30 kPa less than the pressure of the visible bubble point indication when testing for the change in opacity the first porous fluoropolymer membrane region is facing the top and an increased gas pressure is applied to the second porous fluoropolymer membrane region facing the bottom.

2. The air permeable fabric laminate of claim 1 having a liquid displacement pressure (LDP) greater than 10 kPa.

3. The air permeable fabric laminate of claim 1 having a liquid entry pressure greater than 70 kPa to a liquid having a surface tension of about 31 dynes/cm.

4. The air permeable fabric laminate of claim 1 wherein the asymmetric porous membrane has a Z-strength greater than 25 N.

5. The air permeable fabric laminate of claim 1, wherein the first porous membrane region and second the porous membrane region each have a nodal density, and wherein the nodal density of the first porous membrane region is at least 10% greater than the nodal density of the second porous membrane region.

6. The air permeable fabric laminate of claim 1, wherein the Gurley number is less than 200 seconds.

7. The air permeable fabric laminate of claim 1, wherein the Gurley number is greater than 10 seconds.

8. The air permeable fabric laminate of claim 1, wherein the Gurley number is greater than 10 seconds and less than 200 seconds.

9. The air permeable fabric laminate of claim 1, wherein at least one said first porous expanded polytetrafluoroethylene membrane and said second porous expanded polytetrafluoroethylene membrane comprises an expanded modified PTFE membrane.

10. The air permeable fabric laminate of claim 1, further comprising an oleophobic coating.

11. The air permeable fabric laminate of claim 10, wherein the fabric laminate has a liquid entry pressure greater than 70 kPa to a liquid having a surface tension of about 31 dynes/cm.

12. The air permeable fabric laminate of claim 1, wherein the asymmetric porous membrane comprises an oleophobic coating.

13. The air permeable fabric laminate of claim 1, wherein the asymmetric porous membrane has an oil rating greater than 4.

14. The air permeable fabric laminate of claim 1 wherein the asymmetric porous membrane has a bubble point greater than 170 kPa.

15. The air permeable fabric laminate of claim 1 wherein the asymmetric porous membrane has a bubble point greater than 205 kPa.

16. The air permeable fabric laminate of claim 1 comprising an interface between the first porous membrane region and the second porous membrane region that forms a boundary that consists essentially of the materials of the first and second porous fluoropolymer membrane regions.

17. The air permeable fabric laminate of claim 1 wherein the fabric laminate has a weight of about 20 to about 500 gsm.

18. The air permeable fabric laminate of claim 1 wherein the asymmetric porous membrane has a weight between about 2 and 100 gsm.

19. The air permeable fabric laminate of claim 1 where in the laminate has an MVTR greater than about 10,000 g/m²-24 hours.

20. The air permeable fabric laminate of claim 1 further comprising a second textile layer attached to the asymmetric porous membrane on a side opposite the first textile.

21. The air permeable fabric laminate of claim 20 wherein the MVTR is greater than about 10,000 g/m²-24 hours.

22. The air permeable fabric laminate of claim 20 further comprising a water repellent coating.

23. A garment comprising:
a garment outer surface;
a garment inner surface designed to be oriented toward the body of a garment wearer in use; and
an air permeable fabric laminate comprising:
  a. an asymmetric porous membrane comprising:
    i. a first porous fluoropolymer membrane region having a first microstructure, and
    ii. a second porous fluoropolymer membrane region having a second microstructure that is different than the first microstructure,
  b. an outer textile, proximate to the garment outer surface, attached by discontinuous attachments to the asymmetric porous membrane; and
  c. an inner textile, proximate to the garment inner surface, attached by discontinuous attachments to the asymmetric porous membrane on a side opposite the outer textile,
  wherein said first microstructure is a homogenous microstructure throughout said first porous fluoropolymer membrane region,
  wherein said second microstructure is a homogenous microstructure throughout said second porous fluoropolymer membrane region, and said second microstructure is different than the first microstructure and said first microstructure is a tighter microstructure than said second microstructure, and
  wherein the garment has a change in opacity prior to a visible bubble point indication when the first porous fluoropolymer membrane region is facing the top tested with the inner textile facing gas pressure is applied to the second porous fluoropolymer membrane region facing the bottom.

24. The garment of claim 23 wherein the air permeable fabric laminate has a liquid entry pressure greater than 70 kPa with a fluid having a surface tension of about 31 dynes/cm.

25. The garment of claim 23 wherein the air permeable fabric laminate has a Gurley number less than 200 seconds.

26. The garment of claim 23 wherein the fabric laminate further comprises an oleophobic coating.

27. An asymmetric porous membrane comprising:
a first porous fluoropolymer membrane region having a first microstructure, and
a second porous fluoropolymer membrane region having a second microstructure,
wherein said first microstructure is a homogenous microstructure throughout said first porous fluoropolymer membrane region, and
wherein said second microstructure is a homogenous microstructure throughout said second porous fluoropolymer membrane region, and said second microstructure is different than the first microstructure and said first microstructure is a tighter microstructure than said second microstructure, and
wherein the asymmetric porous membrane has a change in opacity prior to a visible bubble point indication when testing for the change in opacity the first porous fluoropolymer membrane region is facing the top and an increased gas pressure is applied to the second porous fluoropolymer membrane region facing the bottom.

28. The asymmetric porous membrane of claim 27 wherein the asymmetric porous membrane has a Z-strength greater than 25N.

29. The asymmetric porous membrane of claim 27, wherein the nodal density of the first porous fluoropolymer membrane region is at least 10% greater than the nodal density of the second porous fluoropolymer membrane region.

30. The asymmetric porous membrane of claim 27, wherein at least one of said first porous fluoropolymer membrane region and said second porous fluoropolymer membrane region comprises an expanded modified polytetrafluoroethylene (PTFE) membrane.

31. The asymmetric porous membrane of claim 27, wherein the asymmetric porous membrane comprises an oleophobic coating.

32. The asymmetric porous membrane of claim 27, wherein the asymmetric porous membrane has an oil rating greater than 4.

33. The asymmetric porous membrane of claim 27 wherein the asymmetric porous membrane has a bubble point greater than 170 kPa.

34. The asymmetric porous membrane of claim 27 wherein the asymmetric porous membrane has a bubble point greater than 205 kPa.

35. The asymmetric porous membrane of claim 27, further comprising an interface between the first porous fluoropolymer membrane region and the second porous fluoropolymer membrane region that forms a boundary that consists essentially of the materials of the first and second porous fluoropolymer membrane regions.

36. The asymmetric porous membrane of claim 27, further comprising a third porous fluoropolymer membrane region.

37. The garment of claim 23, further comprising a third porous expanded polytetrafluoroethylene membrane.

38. The air permeable fabric of claim 1, further comprising a third porous expanded polytetrafluoroethylene membrane.

* * * * *